United States Patent [19]
Rochberger et al.

[11] Patent No.: US 6,272,107 B1
[45] Date of Patent: Aug. 7, 2001

(54) METHOD OF PATH RESTORATION IN AN ATM NETWORK UTILIZING POINT TO POINT SWITCHED VIRTUAL CIRCUITS

(75) Inventors: Haim Rochberger, Netanya; David Keynan, Ramat Gan, both of (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/076,686

(22) Filed: May 12, 1998

(51) Int. Cl.[7] .............................. G01R 31/08; G06F 11/00
(52) U.S. Cl. .......................... 370/216; 370/221; 370/249
(58) Field of Search ................................... 370/216, 217, 370/218, 221, 224, 225, 227, 228, 237, 249, 250, 400, 401, 402, 409, 410

(56) References Cited

U.S. PATENT DOCUMENTS

| | | | |
|---|---|---|---|
| 5,483,536 | 1/1996 | Gunji et al. | 370/85.14 |
| 5,533,005 * | 7/1996 | Ferguson | 370/225 |
| 5,550,818 | 8/1996 | Brackett et al. | 370/60 |
| 5,566,014 | 10/1996 | Glance | 359/124 |
| 5,598,403 * | 1/1997 | Tatsuki | 370/221 |
| 5,646,936 * | 7/1997 | Shah et al. | 370/228 |
| 5,671,215 * | 9/1997 | Foglar | 370/227 |
| 5,848,055 * | 12/1998 | Fedyk et al. | 370/228 |
| 5,974,046 * | 10/1999 | Kim et al. | 370/395 |
| 6,026,077 * | 2/2000 | Iwata | 370/254 |

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking,* vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (Seed's)", printed from website http://www.stw.nl/projecten/T/tel3997.html, 2 pages, Feb. 2, 1997.

* cited by examiner

*Primary Examiner*—Alpus H. Hsu
*Assistant Examiner*—Brian Nguyen
(74) *Attorney, Agent, or Firm*—Howard Zaretsky; McDonnell Boehnen; Hulbert & Berghoff

(57) ABSTRACT

A method of path restoration in an ATM network which attempts to minimize the loss of cells in the event a node or a link fails. The method is suitable for failures in point to point Switched Virtual Circuits (SVCs) in ATM networks and makes use of the bi-directional properties of point to point SVC calls. The method permits the construction of an ATM network which includes call path redundancy whereby if a node or link fails, another path meeting the requirements of the call (if one exists) will be used on an automatic basis. The alternative or redundant path is placed into service in such a way that the flow of data is substantially constant. The switching of the path occurs with almost no data loss and without the overhead time associated with Q.SAAL based detection and signaling.

30 Claims, 27 Drawing Sheets

METHOD OF PATH RESTORATION IN AN ATM NETWORK UTILIZING POINT TO POINT SWITCHED VIRTUAL CIRCUITS

FIELD OF THE INVENTION

The present invention relates generally to data communication networks and more particularly relates to a method of path restoration in an ATM network which utilizes point to point switched virtual circuits.

BACKGROUND OF THE INVENTION

Currently, there is a growing trend to make Asynchronous Transfer Mode (ATM) networking technology the basis of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

More information on ATM networks can be found in the book "ATM: The New Paradigm for Internet, Intranet and Residential Broadband Services and Applications," Timothy Kwok, Prentice Hall, 1998.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical node becomes operational, the nodes attached to it initiate and exchange information via a well known Virtual Channel Connection (VCC) used as a PNNI Routing Control Channel (RCC).

Hello messages are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and the status of its links to its neighbors. Each node then bundles its state information in one or more PNNI Topology State Elements (PTSEs) which are subsequently. flooded throughout the peer group.

PTSEs are the smallest collection of PNNI routing information that are flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNM routing domain.

During a topology database synchronization, the nodes in question first exchange PTSE header information, i.e., they advertise the presence of PTSEs in their respective topology databases. When a node receives PTSE header information that advertises a more recent PTSE version than the one that it has advertised or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet which is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originated a particular PTSE can re-originate that PTSE. PTSEs are reissued both periodically and on an event driven basis.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network. Additional information on link state routing can be found in Section 9.2 of the book Interconnections: Bridges and Routers by Radia Perlman, Addison-Wesley, 1992, incorporated herein by reference.

Once the topology of the network is learned by all the nodes in the network, routes can be calculated from source to destination users. A routing algorithm that is commonly used to determine the optimum route from a source node to a destination node is the Dijkstra algorithm.

In general, one alternative is to use the Dijkstra algorithm to generate the Designated Transit List which is the routing list used by each node in the path during the setup phase of the call. The topology database (i.e. link state database) which includes the PTSEs received from each node, a Path List comprising a list of nodes for which the best path from the source node has been found and a Tentative List comprising a list of nodes that are only possibly the best paths are used in the algorithm. Once it is determined that a path is in fact the best possible path, the node is moved from the Tentative List to the Path List.

More detailed information on the Dijkstra algorithm can be found in Section 9.2.4 of the book Interconnections: Bridges and Routers by Radia Perlman, Addison-Wesley, 1992, incorporated herein by reference.

In ATM networks, when a user desires to transfer data bi-directionally, e.g., voice, multimedia, etc., the user establishes a Switched Virtual Circuit (SVC). SVCs can be either point to point or point to multipoint. Once the circuit is established, a user can send and receive data over the circuit. In addition, in ATM, a user can specify the type and characteristics of the call, e.g., UBR, CBR, call delay, data rate, etc. If the call request is accepted, the network attempts to provide the requested characteristics.

If, however, one of the nodes or one of the links along the path of the call manages to break, then the call will be cleared by the signaling software, e.g., Q.SAAL, and data transfer will be terminated. One solution is to reroute the call in the event of a node failure or link break whereby nodes in the network find an alternative route for the 'broken' call. The down time lost in this case is basically the time for the Q.SAAL signaling layer to detect the broken node or link plus the time needed for the signaling to establish a new route. This is the approach outlined by the ATM Forum.

The ATM Forum approach to all re-routing as outlined above involves waiting for the software on both sides to detect the break. A release is then generated in response thereto and sent back to the originating nodes. The source node subsequently performs a reroute and a new path is established to the destination. A major disadvantage of this approach is that it is inherently slow due to the fact that the mechanism involves the signaling software waiting for various internal timers to time out.

SUMMARY OF THE INVENTION

The present invention is a method of path restoration in an ATM network. The method attempts to minimize the loss of cells in the event a node or a link fails. The method is suitable for failures in point to point Switched Virtual Circuits (SVCs) in ATM networks and makes use of the bidirectional properties of point to point SVC calls.

The method of the present invention permits the construction of an ATM network which includes call path redundancy whereby if a node or link fails, another path meeting the requirements of the call (if one exists) will be used on an automatic basis. The alternative or redundant path is placed into service in such a way that the flow of data is substantially constant. The switching of the path occurs with almost no data loss and without the overhead time associated with Q.SAAL based detection and signaling.

The method creates a second (redundant) path at the time the call is setup. This redundant path is basically idle until a node or link failure event occurs. Thus, it is assumed that in a network that implements this method of restoration, the goals of maintaining the call connection, preserving data flow and minimizing data loss are more important than utilizing network resources most efficiently.

There will be some networks where the utilization of the network is relatively low thus leaving most of the links free most of the time. In addition, the establishment of a call does not 'cost' much while there is little or no traffic on the path. This is especially true when most of the calls are UBR or ABR with MCR equal to zero. A banking operation is a good example of this. In banking, every transaction is very important. Also, the typical bank's ATM network, commonly has most of its resources free most of the time. Thus, the bank's ATM network would benefit greatly from the redundancy method disclosed herein and also would not place excess burdens on the resources of the network.

The method of the present invention comprises two embodiments. The first embodiment is a software only method of restoration. Two calls are set up initially and in the event of a break, the break is detected by software in the nodes on either side of the break. The broken call is switched out and the redundant call is switched in via software running in the switch.

The second embodiment is a combination hardware and software method of restoration. Two calls are set up initially and in the event of a break, the break is detected by hardware on both sides of the break and a special cell is transmitted to the end nodes by each detecting node. Following this special cell are the data cells sent from the end node which are looped back to the end nodes where they are transmitted over the redundant path. The cells received from the user over the UNI port are stored in a buffer until the broken path's pipe is flushed. At that point, the contents of the buffer are transmitted over the redundant path until the buffer is emptied at which point its resources are freed.

Eventually, the Q.SAAL signaling software detects the link break and sends a release to the end nodes. In response, the end nodes attempt to find a new redundant path to replace the one being used as the current active path. If one is found, an SVC is established and the switch tables in the nodes are modified accordingly.

Note that it is preferable that all nodes in the network support the method of the present invention. If none of the nodes other than the source and destination nodes support the method, then in the event of a break, data will be lost until the Q.SAAL (SSCOP) signaling software detects the break and sends a release to the originating nodes. If only one of the transit nodes adjacent to the break other then the source or destination node, support the method, in the event of a break, only the side with the transit node that does not support the method loses data. The side whose transit node does support the method does not lose data other than the cell that is in transmit across the link that failed. If both end nodes support the method, in the event of a break, no data is lost on either side other than the cell that is in transit across the link that broke. This last case is the ideal case. A complete listing of all the possible combinations of source, destination and transit node and the degree of support they yield is presented in Table 1 below, wherein a '1' indicates that the particular node supports the method of the present invention and a '0' means it does not.

TABLE 1

| Source Node | Destination Node | Transit Node (Source Side) | Transit Node (Destination Side) | Degree of Support |
|---|---|---|---|---|
| 0 | 0 | 0 | 0 | prior art |
| 0 | 0 | 0 | 1 | prior art |
| 0 | 0 | 1 | 0 | prior art |
| 0 | 0 | 1 | 1 | prior art |
| 0 | 1 | 0 | 0 | prior art |
| 0 | 1 | 0 | 1 | prior art |
| 0 | 1 | 1 | 0 | prior art |
| 0 | 1 | 1 | 1 | prior art |
| 1 | 0 | 0 | 0 | call ultimately dropped |
| 1 | 0 | 0 | 1 | call ultimately dropped |
| 1 | 0 | 1 | 0 | call ultimately dropped |
| 1 | 0 | 1 | 1 | call ultimately dropped |
| 1 | 1 | 0 | 0 | some data loss on both sides; call not dropped |
| 1 | 1 | 0 | 1 | some data loss on source side; call not dropped |
| 1 | 1 | 1 | 0 | some data loss on dest. side; call not dropped |
| 1 | 1 | 1 | 1 | no data loss on either side; call not dropped |

Note that in all cases where the source node does not support the method, the result is similar to the scenario of the prior art. If only the source node supports the method, data is not lost initially but the call is subsequently dropped since the destination node does not support the method. If only the source and destination nodes support the method, the release by the end nodes via the Q.SAAL signaling. At that time, the redundant path will be used. If only one of the transit nodes adjacent to the break support the method, than that side of the circuit will not lose data aside from the cell in transit across the break. The side with the transit node that does not support the feature relies on the Q.SAAL signaling to send release to the end node, thus resulting in some data loss.

There is therefore provided in accordance with the present invention, in an Asynchronous Transfer Mode (ATM) network including a source and destination user, end nodes including source and destination nodes and a plurality of transit nodes, a method of restoring a call in the event of a link failure, the method comprising the steps of establishing a first Switched Virtual Circuit (SVC) call from the source user to the destination user to function as an active path, establishing a second Switched Virtual Circuit (SVC) call from the sourc node to the destination node to function a redundant path, configuring the end nodes to utilize the first SVC as the active path, configuring the end nodes to utilize the second SVC as the redundant path, receiving an indication at the end nodes that a link failure has occurred and configuring the end nodes to use the redundant path in response to the indication.

The step of configuring the end nodes to utilize the second SVC comprises the step of searching each respective node for a call previously established having the same call ID. The step of receiving an indication comprises the step of generating and sending a release message on the nodes located on either side of the link failure. The step of configuring the end nodes to use the redundant path comprises the step of checking on each end node whether an entry exists in a redundant portion of a switching table maintained within each node. The method further comprises the step of freeing the resources held by the active path after rerouting cell traffic over the redundant path.

The method further comprises the step of establishing a third SVC in the event the redundant path fails before a link failure occurs, the third SVC functioning as a replacement redundant path.

There is also provided in accordance with the present invention, in an Asynchronous Transfer Mode (ATM) network including a source and destination user, end nodes including source and destination nodes and a plurality of transit nodes, a method of establishing a redundant path, the method comprising the steps of establishing a first Switched Virtual Circuit (SVC) call from the source user to the destination user, indicating to the destination node and any intermediary transit nodes, via a first indication, that the first SVC is to function as an active path, configuring the destination node and the transit nodes, in response to the first indication, and the source node to utilize the first SVC as the active path in a redundant call, establishing a second SVC call from the source node to the destination node, indicating to the destination node and any intermediary transit nodes, via a second indication, that the second SVC is to function as a redundant path and configuring the destination node and the transit nodes, in response to the second indication, and the source node to utilize the second SVC as the redundant path in a redundant call.

The step of indicating that the first SVC is to function as an active path comprises the steps of sending a restore setup message from the source node to the destination node, configuring the destination node, in response to the restore setup message, to use the first SVC as an active path and replying to the source node with a restore confirm message.

The step of indicating that the second SVC is to function as a redundant path comprises the steps of sending a restore setup message from the source node to the destination node, configuring the destination node, in response to the restore setup message, to use the second SVC as a redundant path and replying to the source node with a restore confirm message. The step of establishing a second SVC call comprises the step of calculating the redundant path such that it does not include any of the nodes on the active path with the exception of the end nodes.

The method further comprises the step of checking, on the destination node, if the NCCI field of the second SVC call matches that of any call previously received. The step of configuring in response to the second indication comprises the step of associating the two outbound VPI/VCI pairs on the source node with the single inbound VPI/VCI pair from the source user. The step of configuring in response to the second indication comprises the step of associating the two inbound VPI/VCI pairs on the destination node with the single outbound VPI/VCI pair to the destination user. The method further comprises the step of configuring any intermediary transit nodes between the end nodes for loopback operation in the event of the link failure.

There is further provided in accordance with the present invention, in an Asynchronous Transfer Mode (ATM) network including a source and destination user, end nodes including source and destination nodes and a plurality of transit nodes, a method of switching to a redundant path previously established, the method comprising the steps of detecting the occurrence of the link failure by the detecting nodes on either side of the break, the link failure thus creating a broken active path, sending a loopback cell back from each detecting node to its respective end node, looping back cells arriving at the detecting nodes to their respective end nodes, detecting the arrival of the loopback cell at the end nodes, sending a flush cell out onto the broken active path by each the end node, buffering cells received from the source user and the destination user in a buffer within each end node, transmitting cells received from the broken active path over the redundant path, transmitting the contents of the buffer on each the end node onto the redundant path and transmitting cells received from the source user and the destination user directly onto the redundant path.

The method further comprises the steps of sending a release via software from the detecting nodes on either side of the break to their respective end nodes, calculating a third SVC to function as a new redundant path, establishing the third SVC as the new redundant path, releasing the active path and configuring the second SVC as a new active path and configuring the third SVC as the new redundant path.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ABR | Absolute Bit Rate |
| ANSI | American National Standards Institute |
| ATM | Asynchronous Transfer Mode |
| CBR | Constant Bit Rate |
| CCITT | Comite Consulatif International Telegraphique et Telephonique |
| FDDI | Fiber Distributed Data Interface |
| FSM | Finite State Machine |
| IISP | Interim Inter-Switch Signaling Protocol |
| ITU | Iternational Telecommunications Union |
| MCR | Minimal Cell Rate |
| NCCI | Network Call Correlation Identifier |
| OAM | Operation And Management |
| PNNI | Private Network to Network Interface |
| PTSE | PNNI Topology State Element |
| PTSP | PNNI Topology State Packet |
| PVC | Permanent Virutal Circuit |
| Q.SAAL | Signaling ATM Adaptation Layer |
| RCC | Routing Control Channel |
| SSCOP | Service Specific Connection Oriented Protocol |
| SVC | Switched Virtual Circuit |
| UBR | Unspecified Bit Rate |
| UNI | User to Network Interface |
| VCC | Virtual Channel Connection |
| VCI | Virtual Circuit Identifier |
| VPI | Virtual Path Identifier |

General Description

Figure 1:
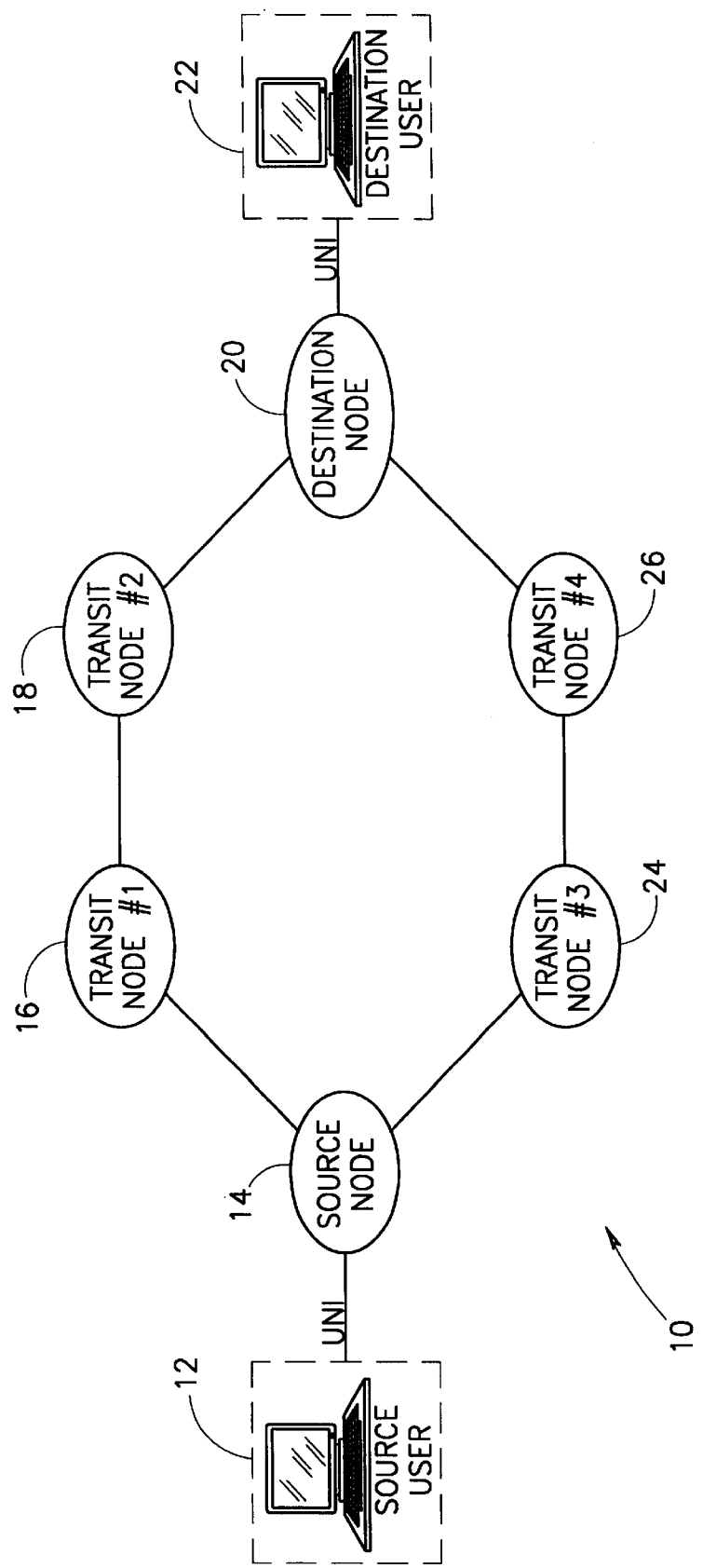
FIG. 1 is a diagram illustrating an example ATM network having a source and destination node and multiple transit nodes, which is used to illustrate the principles of the present invention.

A diagram illustrating an example ATM network having a source and destination node and multiple transit nodes, which is used to illustrate the principles of the present invention, is shown in FIG. 1. A source user 12 is connected to a source node 14 via a UNI connection. Similarly, a destination user 22 is connected to a destination node 20 via a UNI connection. The source node 14 and destination node 20 are connected by one or more transit nodes. For illustrative purposes only, two transit nodes are shown in the figure for each of the paths. The upper path connecting the source and destination nodes comprises transit nodes 16, 18 and the lower path connecting the source and destination nodes comprises transit nodes 24, 26.

First Path Restoration Method

The principle of the method of the first embodiment is that two call paths are set up between the source and destination nodes: a primary call path and a redundant, i.e., secondary, call path. The two call paths are, however, associated with each other in the switching tables of the two end nodes, i.e., the source and destination nodes.

Figure 2:
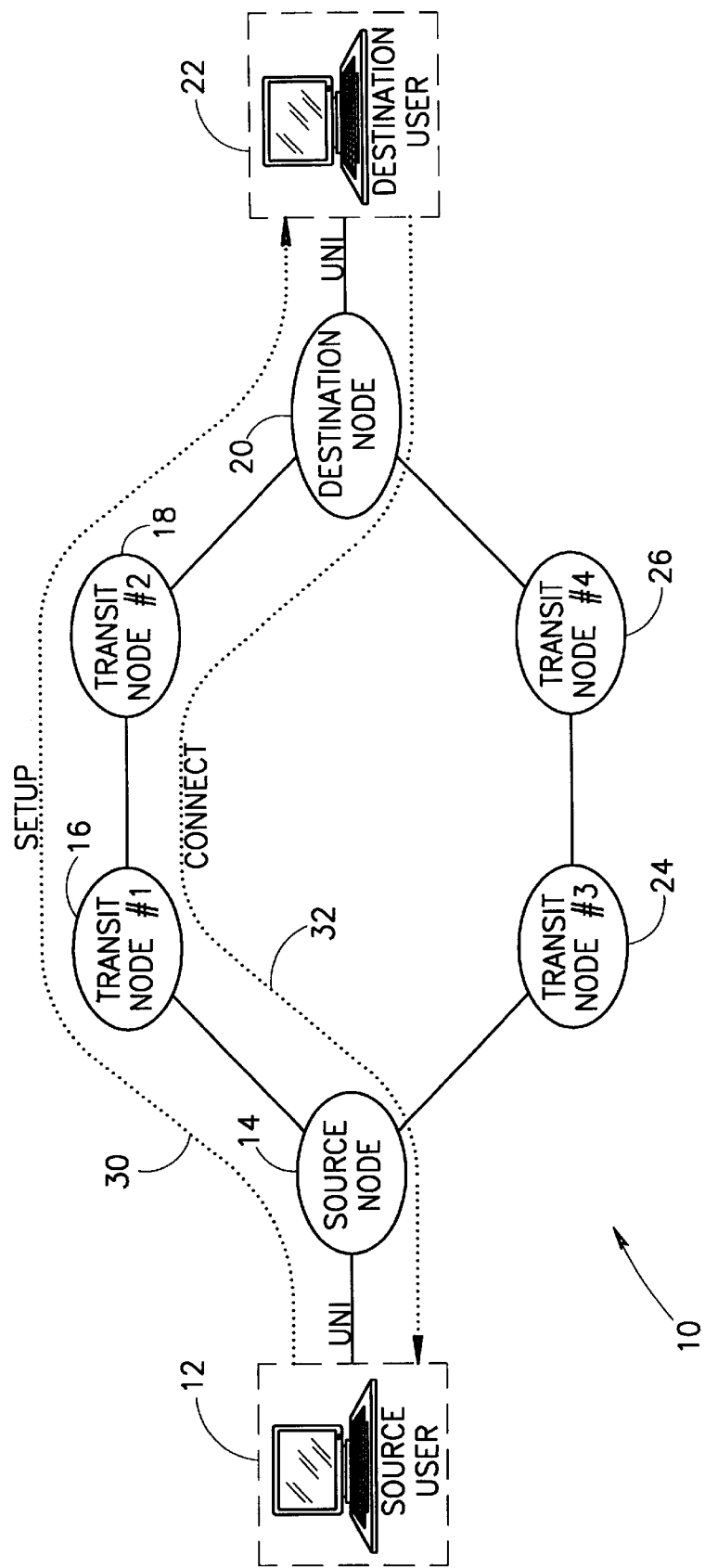
FIG. 2 is a diagram illustrating the path of the SETUP and CONNECT messages sent between the source user and the destination user to establish the primary path.

A diagram illustrating the path of the SETUP and CONNECT messages sent between the source user and the destination user to establish the primary path is shown in FIG. 2. The dotted line 30 represents the path the SETUP message takes from the source user to the destination user. In response to the SETUP MESSAGE, the destination node replies with a CONNECT message which is represented by the dotted line 32.

Figure 3:
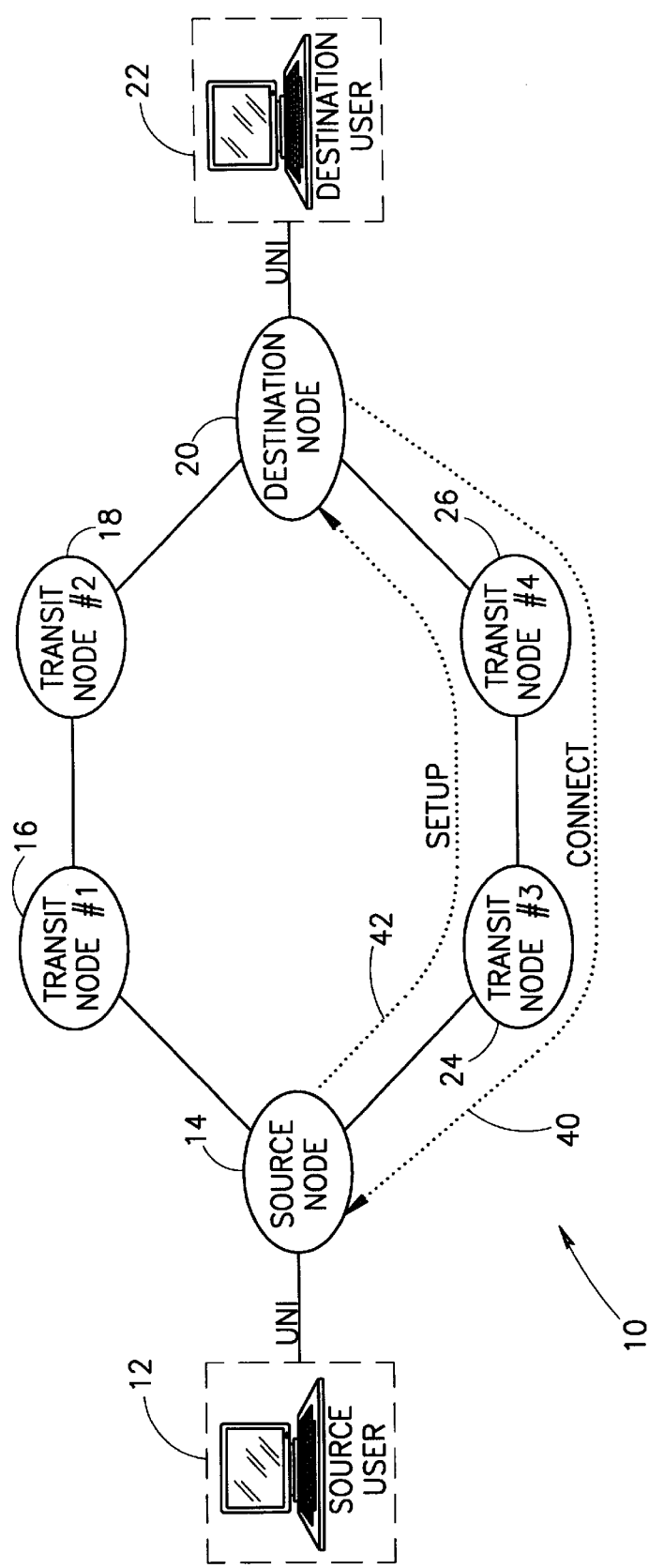
FIG. 3 is a diagram illustrating the path of the SETUP and CONNECT messages sent between the source user and the destination user to establish the redundant path.

A diagram illustrating the path of the SETUP and CONNECT messages sent between the source node and the destination node to establish the redundant path is shown in FIG. 3. The dotted line 40 represents the path the SETUP message takes from the source node to the destination node. In response to the SETUP MESSAGE, the destination node replies with a CONNECT message which is represented by the dotted line 42. Note that the users are not aware of this second redundant path being created. The call setup is handled by the source and destination nodes and not the users.

Figure 4:
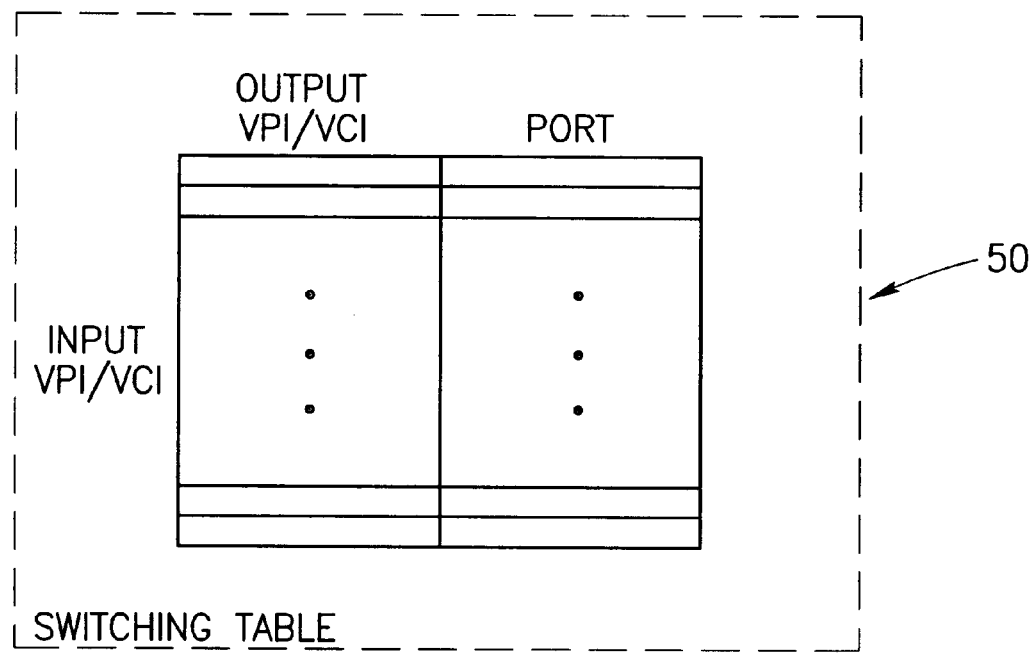
FIG. 4 is a diagram illustrating the structure of a prior art switching table located within a node.

A diagram illustrating the structure of a prior art switching table located within a node is shown in FIG. 4. The switching table, generally referenced 50, has rows representing the input VPI/VCI pairs and columns representing output VPI/VCI pairs plus their respective ports. In conventional systems, each point to point call has associated with it an input VPI/VCI, an output VPI/VCI and associated port.

Figure 5:
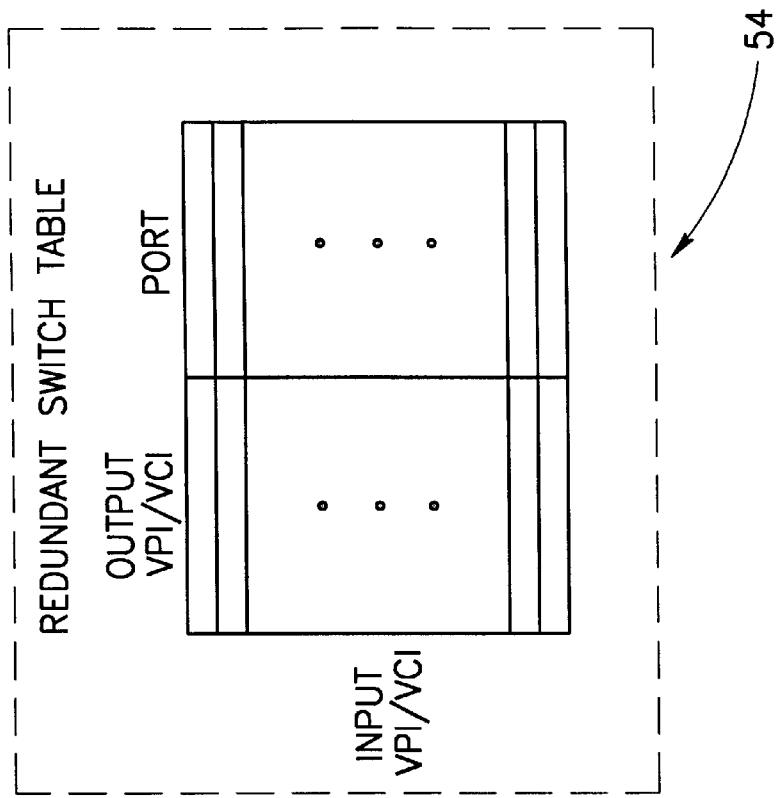
FIG. 5 is a diagram illustrating the structure of the switching table located within a node implementing the method of the present invention.
Figure 5:
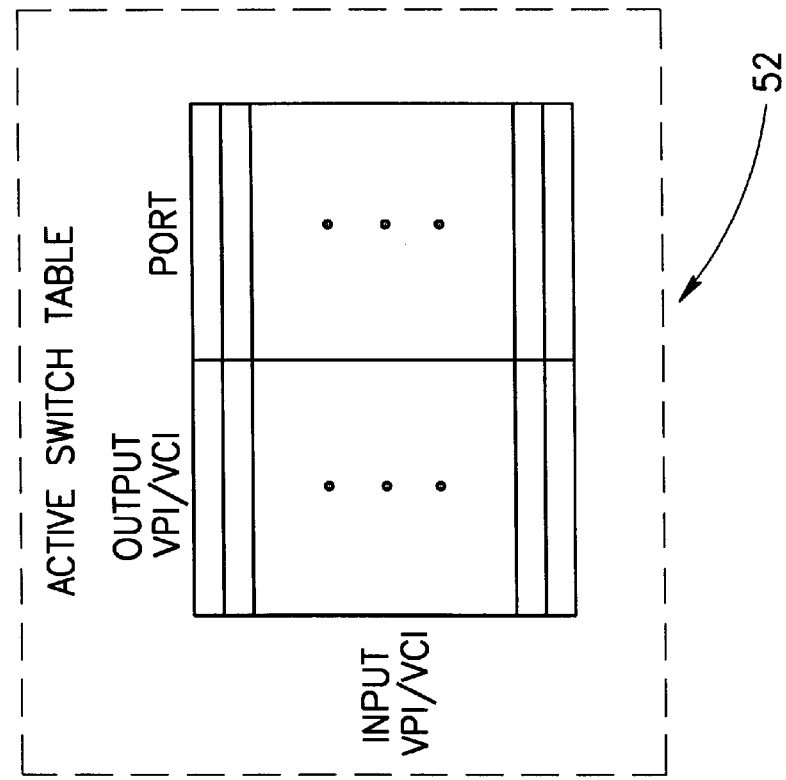

A diagram illustrating the structure of the switching table located within a node implementing the present invention is shown in FIG. 5. The switching table comprises two portions: an active portion 52 and a redundant portion 54. Both the source and destination nodes must associate the primary call with the redundant call. Thus, once both calls are established, both the source and destination node will have entries in the active (primary) and redundant portions of the switch table. On the source node, the two input VPI/VCI entries will be the same while the two output VPI/VCI pairs will differ. Conversely, on the destination node, the two input VPIVCI entries will differ while the two output VPI/VCI pairs will be the same.

As described previously, an important aspect of the present invention is that the primary and redundant calls be associated with each other. One way to accomplish this is to use the NCCI indicator which is part of the ATM PNNI-2 standard. The NCCI indicator describes the incoming connection making the connection unique on a global basis throughout the entire network. Thus, in operation, the source node (and not the source user) generates the SETUP message. The SETUP message is generated having the same NCCI indication as that of the call along the primary path. In response to the SETUP message, the destination node checks if it has already established a call with that NCCI indication. If so, it adds an entry to the redundant portion of its switch table, does not forward the call to the destination user and replies with a CONNECT message to the source node. In response to the CONNECT message, the source node places an entry in the redundant portion of its switch table indicating the output VPI/VCI for the redundant path.

Figure 6:
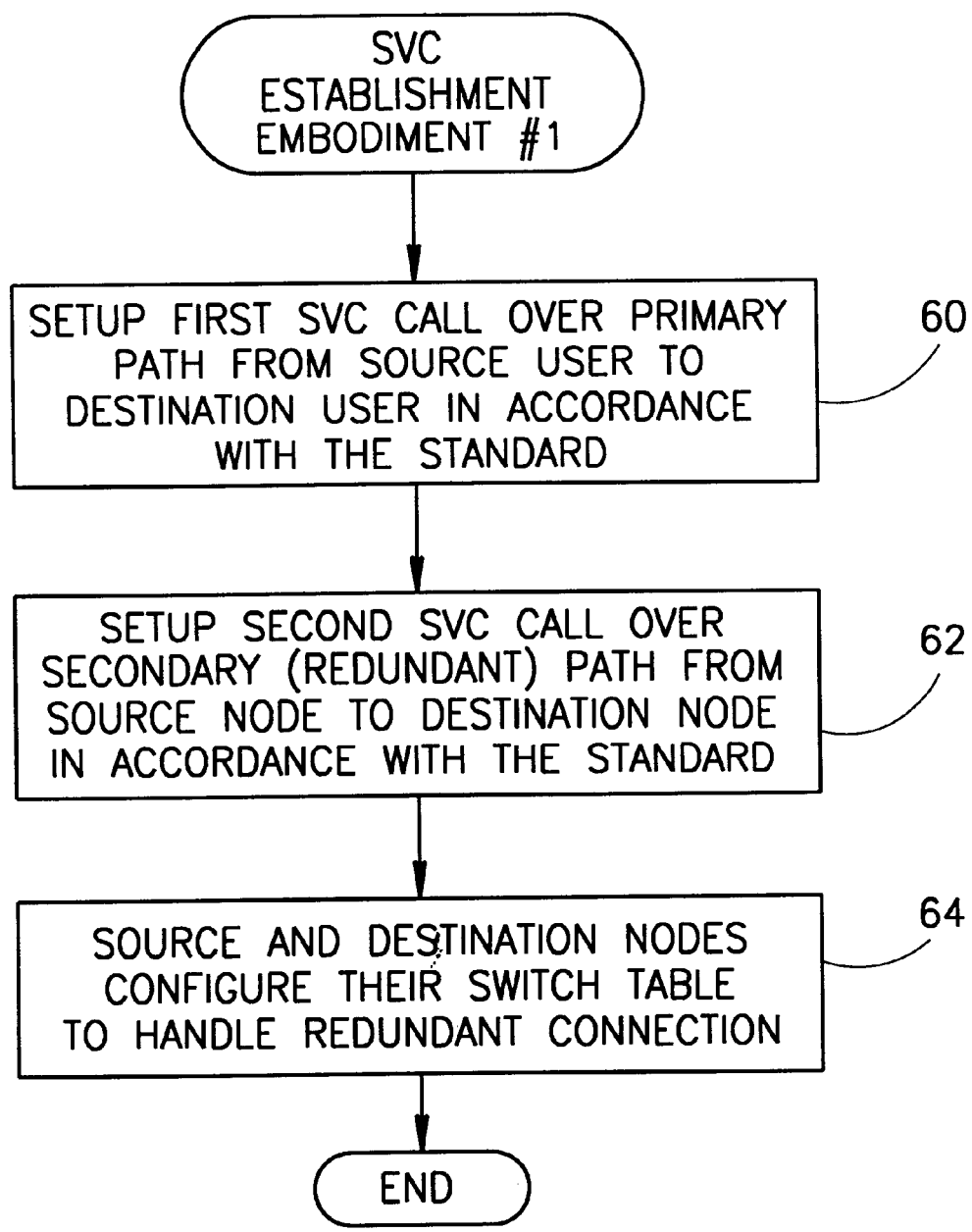
FIG. 6 is a flow diagram illustrating the method of the first embodiment of establishing switched virtual circuits.

A flow diagram illustrating the method of the first embodiment of establishing switched virtual circuits is shown in FIG. 6. The first step is to setup a first SVC call over the primary path from the source user to the destination user in accordance with conventional ATM procedures (step 60). Note that PVCs may also be used with the restoration methods of the present invention. Next, a second SVC call is setup over the redundant (secondary) path from the source node to the destination node in the conventional manner (step 62). The source and destination node then configure their switch tables to handle the redundant connection (step 64).

Figure 7:
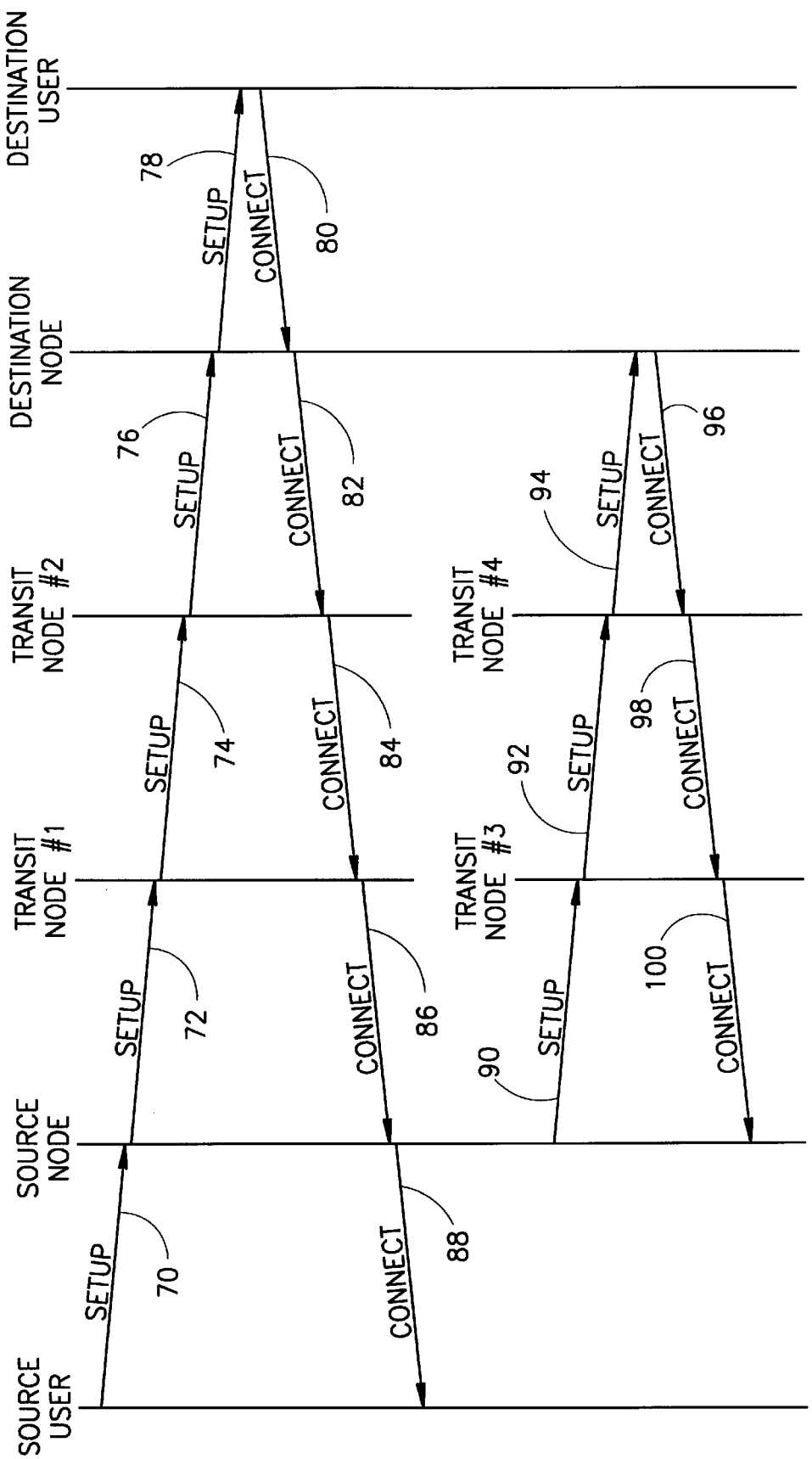
FIG. 7 is a diagram illustrating the message flow between the source user, source node, transmit nodes, destination node and destination user that occurs during the establishment of the primary and redundant paths.

A diagram illustrating the message flow between the source user, source node, transmit nodes, destination node and destination user that occurs during the establishment of the primary and redundant paths is shown in FIG. 7. As described previously, the SETUP message for the primary path call is generated by the source user and sent to the source node (reference 70). The source node allocates resources for the call and forwards the SETUP message to transit node #1 (reference 72). The SETUP message is then transferred, in turn, from transit node #1 to transit node #2 (reference 74), from transit node #2 to the destination node (reference 76) and finally to the destination user (reference 78). In response, the destination user generates a CONNECT message which is forwarded to the destination node (reference 80), transit node #2 (reference 82), transit node #1 (reference 84), source node (reference 86) and finally to the source user (reference 88).

Once the primary path call is established, the redundant call is setup. The source node generates a SETUP message having the same NCCI indication which is forwarded, in turn to transit node #3 (reference 90), transit node #4 (reference 92) and the destination node (reference 94).). In response, the destination node generates a CONNECT message which is forwarded to transit node #4 (reference 96), transit node #3 (reference 98) and the source user (reference 100).

Figure 8:
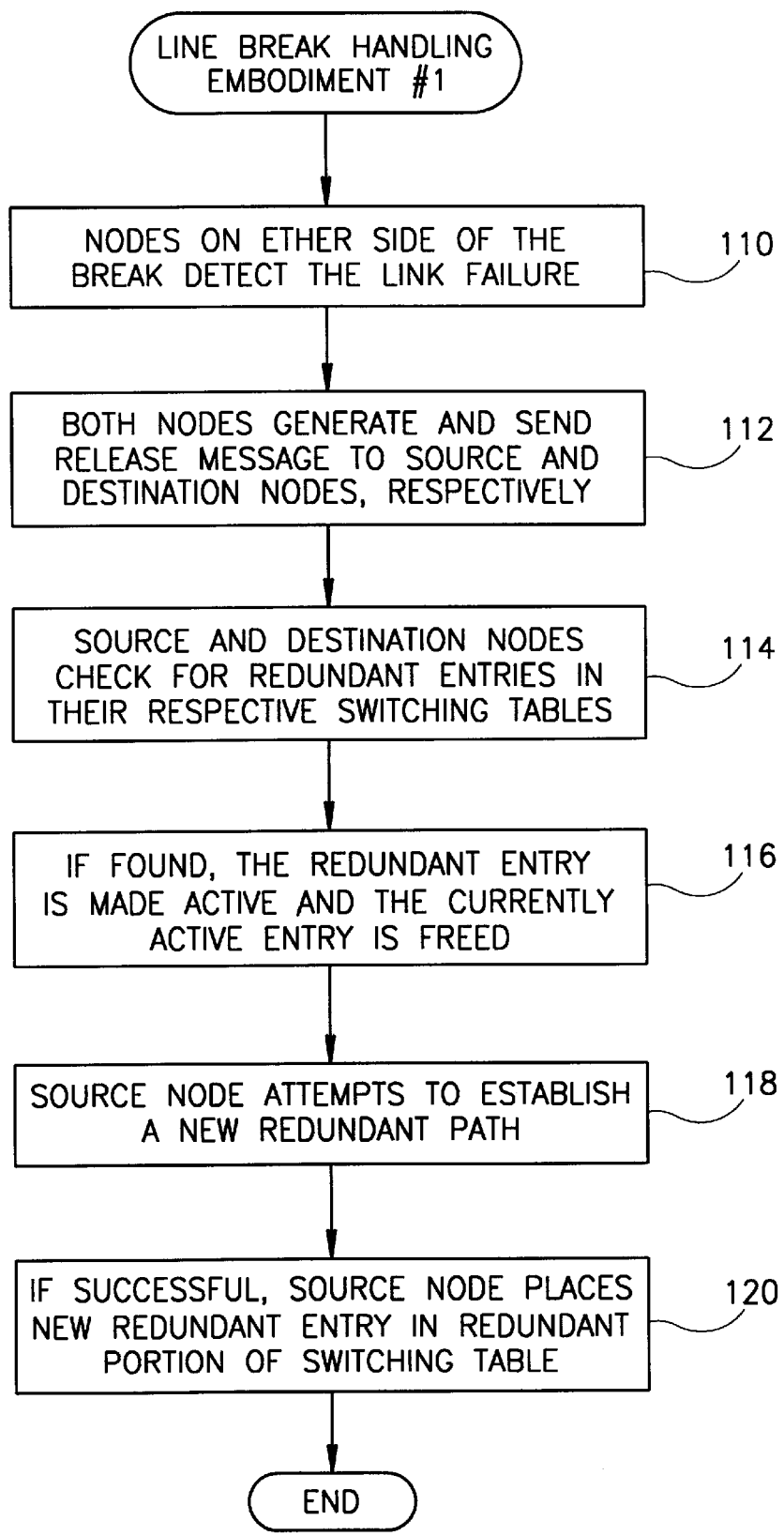
FIG. 8 is a flow diagram illustrating the method of the first embodiment of handling a node or link break.

A flow diagram illustrating the method of the first embodiment of handling a node or link break is shown in FIG. 8. The first step is that both nodes on either side of the break detect the occurrence of the link break (step 110). Next, both of the nodes on either side of the link break generate and send RELEASE messages to the source and destination nodes, respectively (step 112). The release message is simply forwarded by the intermediary transit nodes between the nodes on either side of the link break and the source and destination nodes.

In response to the RELEASE message, both the source and the destination nodes check for redundant entries in their switch tables (step 114). The source node checks for an entry in its redundant table under the same input VPI/VCI pair of the active call. The destination node checks for an entry in its redundant table under the same output VPI/VCI pair.

If an entry is found, it is placed into the active table which functions to make the redundant call the active call (step 116). The resources associated with previously active entry in the switch table are freed. The source node then attempts to establish a new redundant path (step 118). If it is successful in establishing a new redundant path, the source node places the new redundant entry in the redundant portion of the switch table (step 120). Likewise, a similar process occurs on the destination node whereby the redundant portion of the switch table is updated with the new redundant path VPI/VCI information.

At this point, data flows from the source user to the destination user over the redundant path (which is now the active path). Both the source and destination users are unaware that a break occurred in the active path aside from a short interruption in the flow of data cells.

Figure 9:
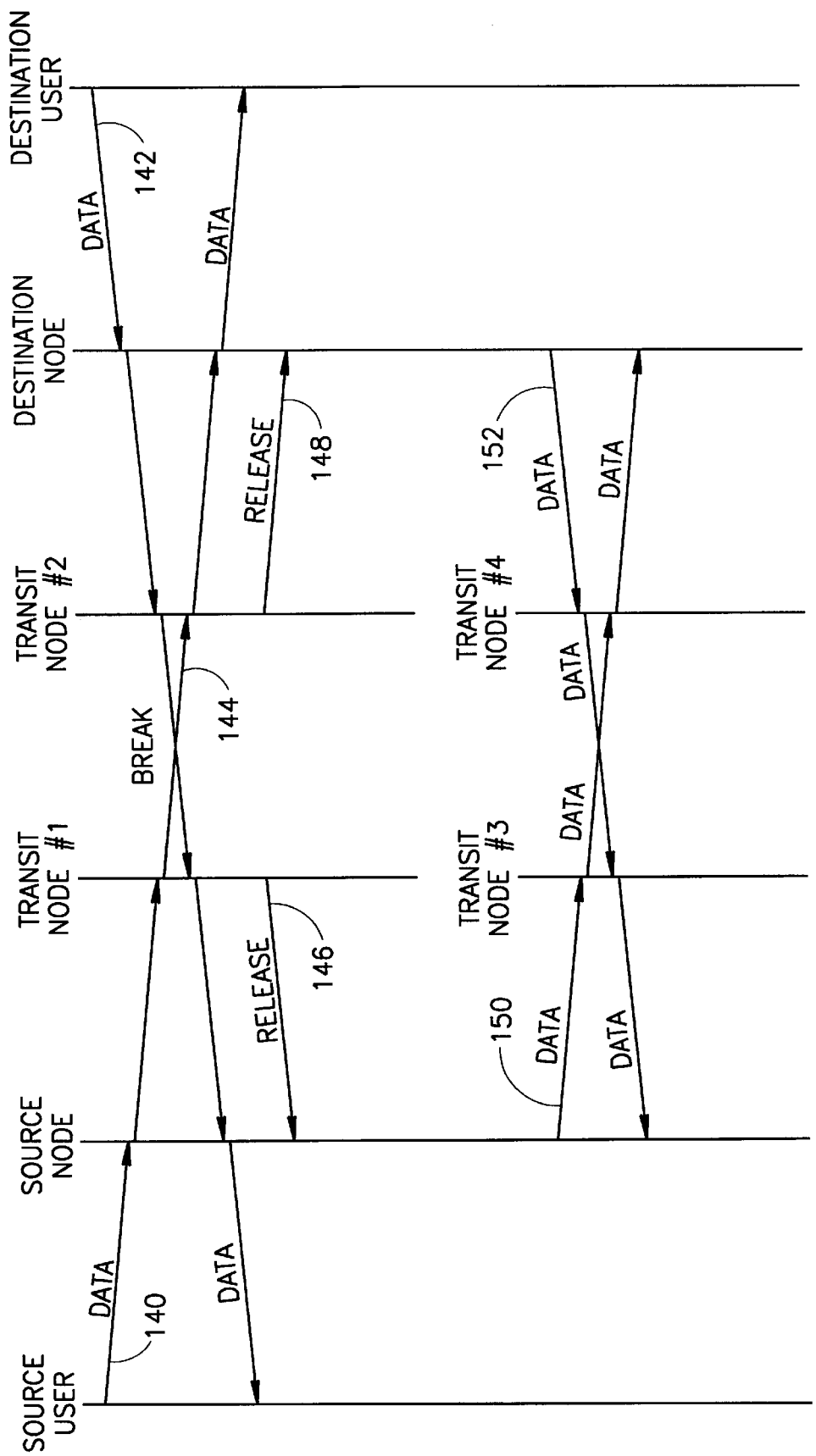
FIG. 9 is a diagram illustrating the message flow between the source user, source node, transmit nodes, destination node and destination user that occurs when a node or link breaks using the method of the first embodiment.

A diagram illustrating the message flow between the source user, source node, transmit nodes, destination node and destination user that occurs when a node or link breaks using the method of the first embodiment is shown in FIG. 9. As described above, the data flow between the source user (reference 140) and destination user (reference 142) is interrupted by a link break represented by the large 'X' (reference 144) in FIG. 9. The break is detected by the nodes on either side of the link break. The nodes, in response, generate a RELEASE message which is sent to the source node (reference 146) and the destination node (reference 148).

Upon receipt, both source and destination nodes check their switch tables for redundant entries. If found, the redundant entries are made active and data flow resumes between the source node (reference 150) and the destination node (reference 152).

It is important to note that in the first embodiment, data cells are lost until the point in time when the release is received and the hardware is configured to use the redundant VPI/VCI entries. An advantage of this first embodiment is that no change to the hardware in the switches is required. The method operates using the switch software and can be implemented by manipulating the switching database, i.e., the switch table, within the node.

Second Path Restoration Method

The method of the second embodiment will now be described in more detail. Note that the example provided below to illustrate the principles of the present invention assumes PNNI is used to route the calls. The scope of the present invention, however, is not limited to PNNI and can be applied to other routing schemes as well. Note also that the hardware within the switches must be modified in order to implement the method described hereinbelow.

Establishment of the Redundant Path

A user first establishes a call in the conventional manner of ATM using standard signaling and SETUP and CONNECT messages. Once the call is in the active state, meaning a CONNECT arrives and data can now be sent, the originating node (source node) sends a RESTORE_SETUP message having a special identifier called a RESTORE_ID to the destination node over the SVC. The RESTORE_ID may be constructed from the origination node ID in combination with a unique sequential number. It is important that the RESTORE_SETUP message comprise a single cell having a unique tag as this permits the switch hardware to recognize the message more easily. OAM cells may be used with one of the internal bits set to indicate the type of message. The terminating node (destination node) responds with a confirmation message called RESTORE_CONFIRM which it sends back to the originating node. Note that both users are not aware of these messages as they are sent on the UNI ports between the source and destination nodes only.

Figure 10:
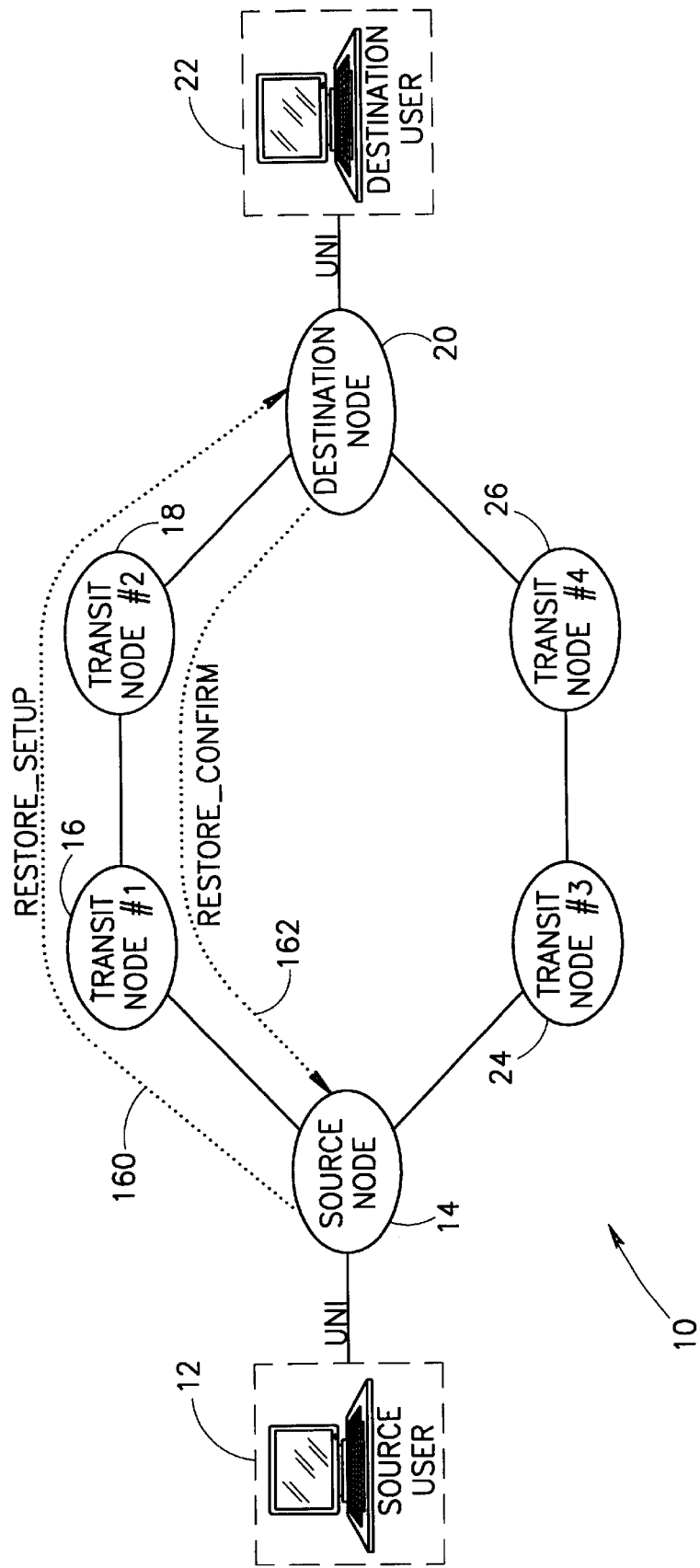
FIG. 10 is a diagram illustrating the path of the RESTORE_SETUP and RESTORE_CONFIRM messages sent between the source node and the destination node to establish the primary path in the second embodiment.

A diagram illustrating the path of the RESTORE_SETUP and RESTORE_CONFIRM messages sent between the source node and the destination node to establish the primary path in the second embodiment is shown in FIG. 10. The dotted line 160 represents the path the RESTORE_SETUP message takes from source node to destination node. The dotted line 162 represents the path the RESTORE_CONFIRM message takes from the destination node back to the source node. In response to the setup message, the destination node configures its hardware such that the active path already setup is flagged as part of a restoration connection. The active path is associated with the RESTORE_ID received from the source node.

In response to receiving the RETORE_CONFIRM message, the source node calculates a new path, if one exists, that does not include any node from the previous path besides the source and destination nodes. This can be performed in the case when Dijkstra is used for route calculations by temporarily putting crankback stub elements of the type 'node blocked' into the tree for each node along the active path excluding the source and destination nodes. Then, the next time Dijkstra is run, the path calculated, if one exists, will not pass through any of the nodes along the currently active path.

This new path can be used to reach the destination and a SVC call is established using conventional ATM signaling with SETUP and CONNECT messages. The source node uses the same NCCI for the redundant call as it used for the active call previously. At this point, the destination node realizes that this is a call from the same source node, thus it does not forward the call to the destination user. The destination node knows it is the same call when it finds an existing call in its database with a matching NCCI field.

Figure 11:
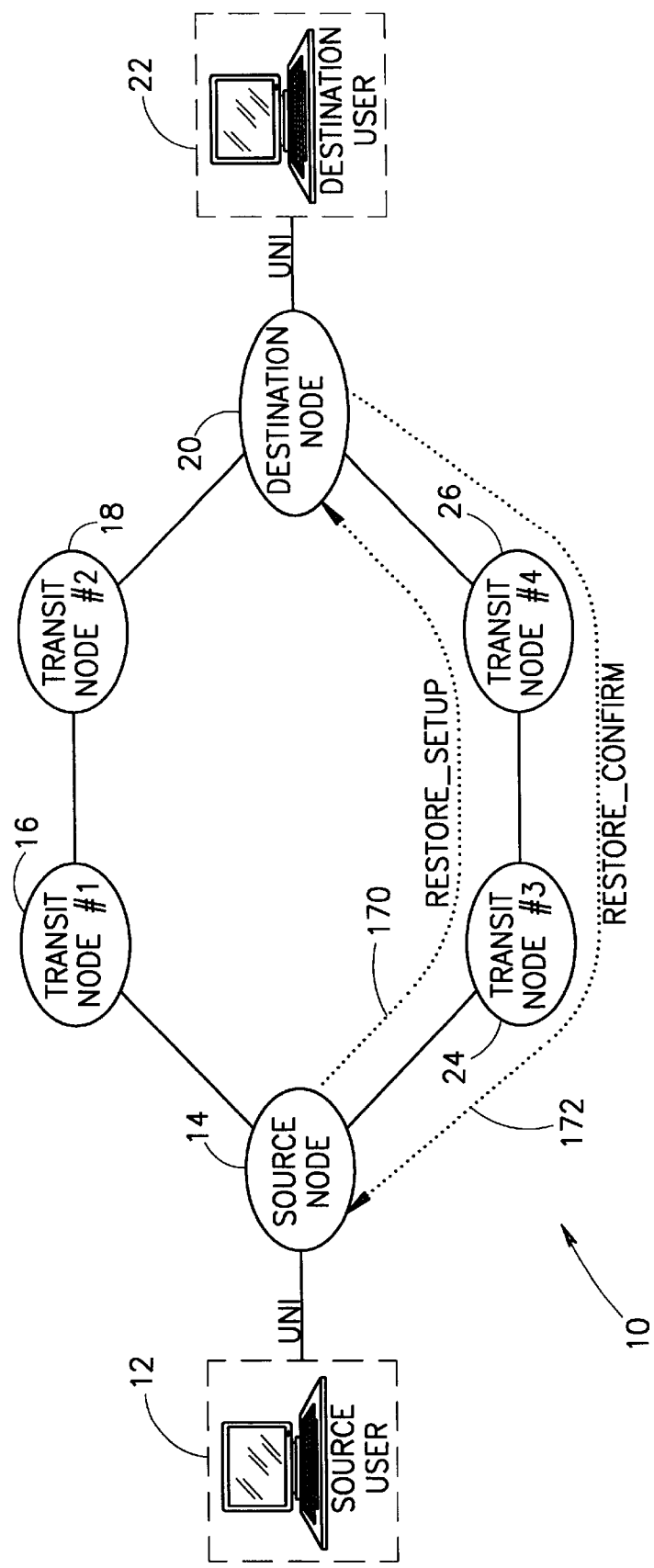
FIG. 11 is a diagram illustrating the path of the RESTORE_SETUP and RESTORE_CONFIRM messages sent between the source node and the destination node to establish the redundant path in the second embodiment.

In response to receiving the CONNECT message from the destination node, the source node sends a RESTORE_SETUP message to the destination node. A diagram illustrating the path of the RESTORE_SETUP and RESTORE_CONFIRM messages sent between the source node and the destination node to establish the redundant path in the second embodiment is shown in FIG. 11. The dotted line 170 represents the path on the redundant SVC taken by the RESTORE_SETUP message takes from source node to destination node. The message includes the same RESTORE_ID field as was sent previously on the active path. The dotted line 172 represents the path the RESTORE_CONFIRM message from the destination node back to the source node.

In response to the RESTORE_SETUP message, the destination node knows that the two calls are really the same since the RESTORE_ID fields match. Thus, it knows that the redundant path is meant as a backup to the active path in the event of a node failure or link break. The destination node does not forward the setup to the user over the UNI port but it configures its hardware such that the two inbound call's VPI/VCI pairs are associated with the same single outbound VPI/VCI pair. This can be done by maintaining active and redundant tables in the switching table of the switch as shown in FIG. 5 in connection with the first embodiment.

Figure 12:
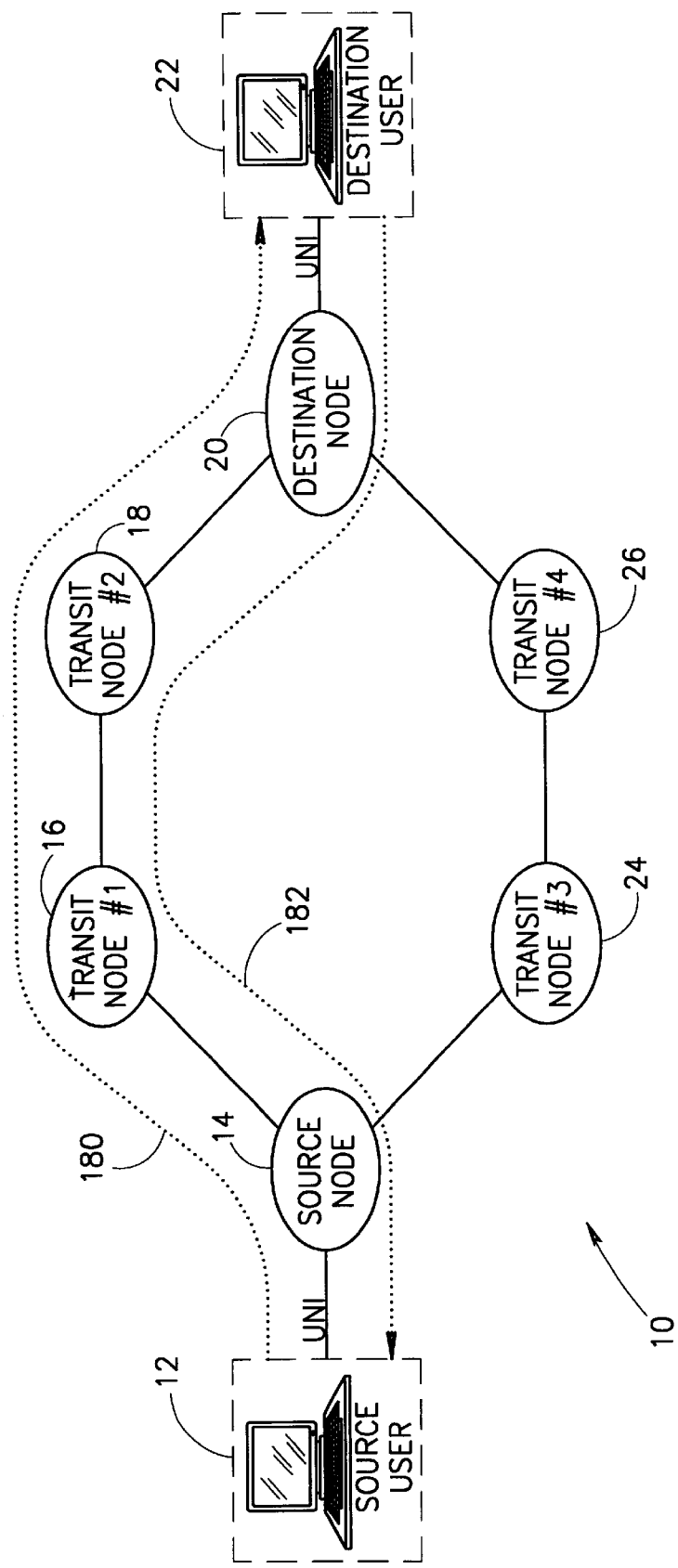
FIG. 12 is a diagram illustrating the data path that exists before a node or link break occurs.

In response to the RESTORE_CONFIRM, message the source node associates the two outbound connections, i.e., active and redundant, with a single inbound connection. The VPI/VCI pairs in the switching tables are thus configured accordingly. Once this is done, data traffic can flow between the source and destination users along the active path. A diagram illustrating the data path that exists before a node or link break occurs is shown in FIG. 12. Traffic from the source to destination user is represented by dotted line 180 and traffic from the destination to the source user is represented by dotted line 182.

Figure 13A:
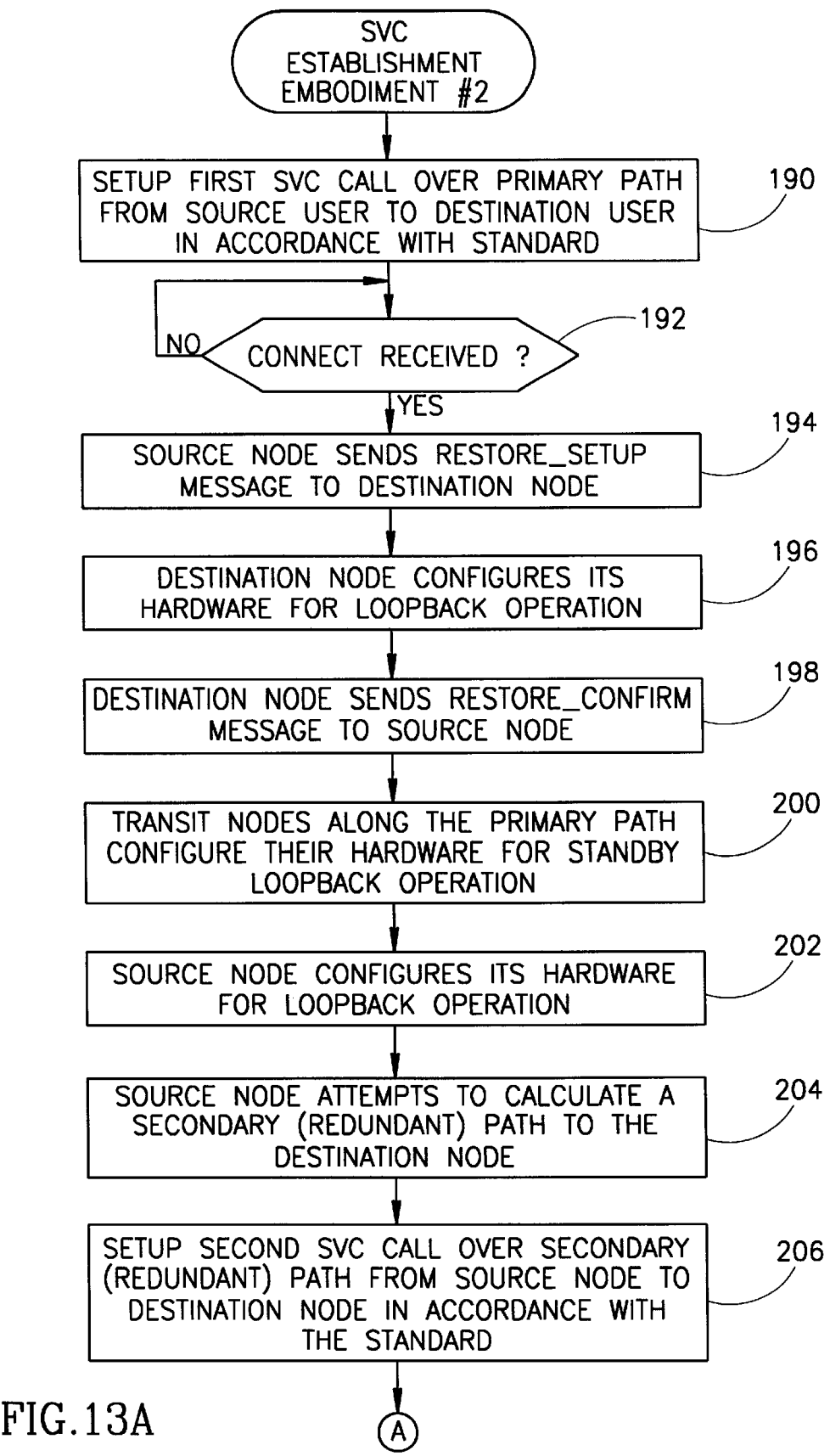
FIGS. 13A, 13B and 13C are a flow diagram illustrating the method of the second embodiment of establishing switched virtual circuits.
Figure 13B:
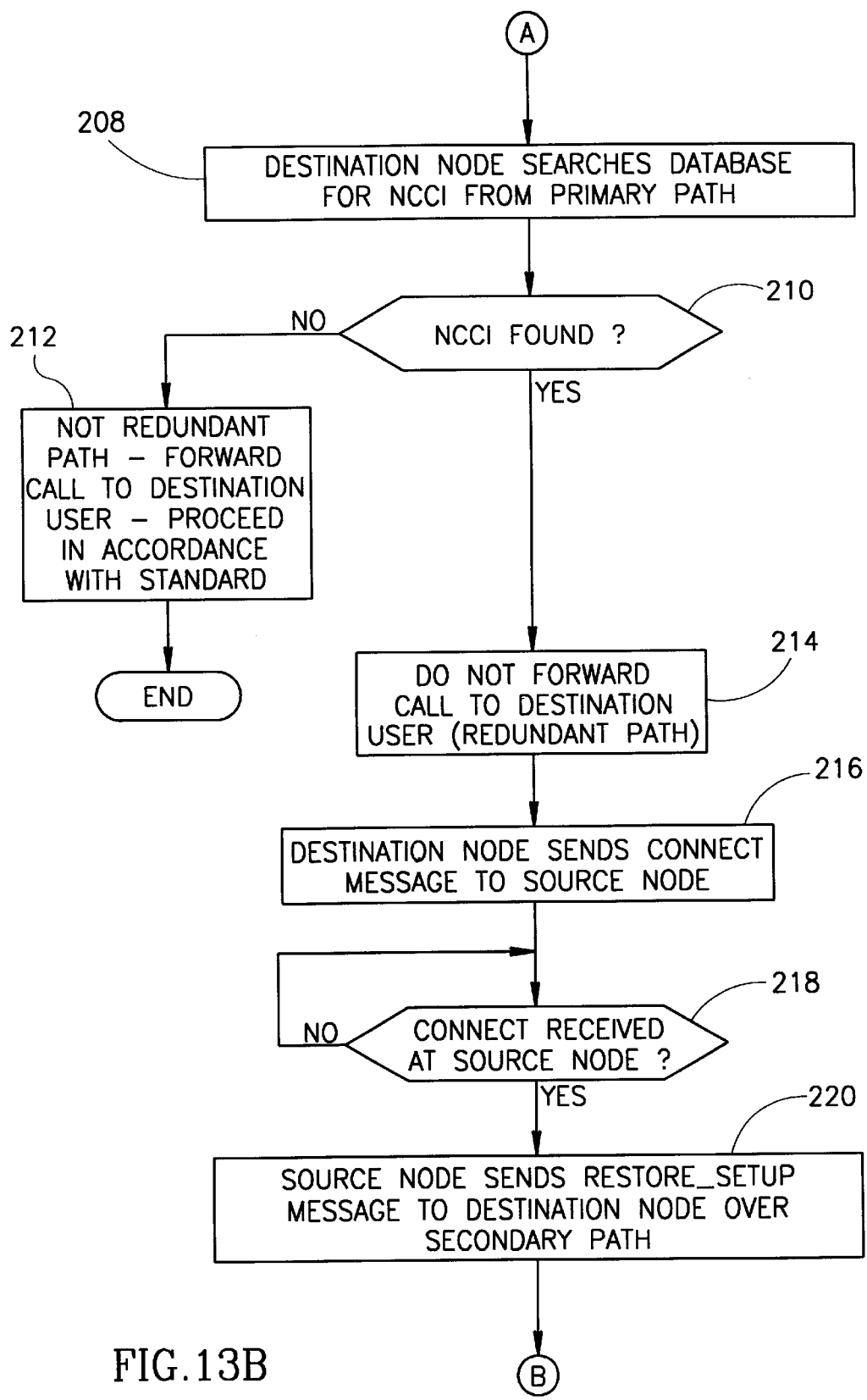
Figure 13C:
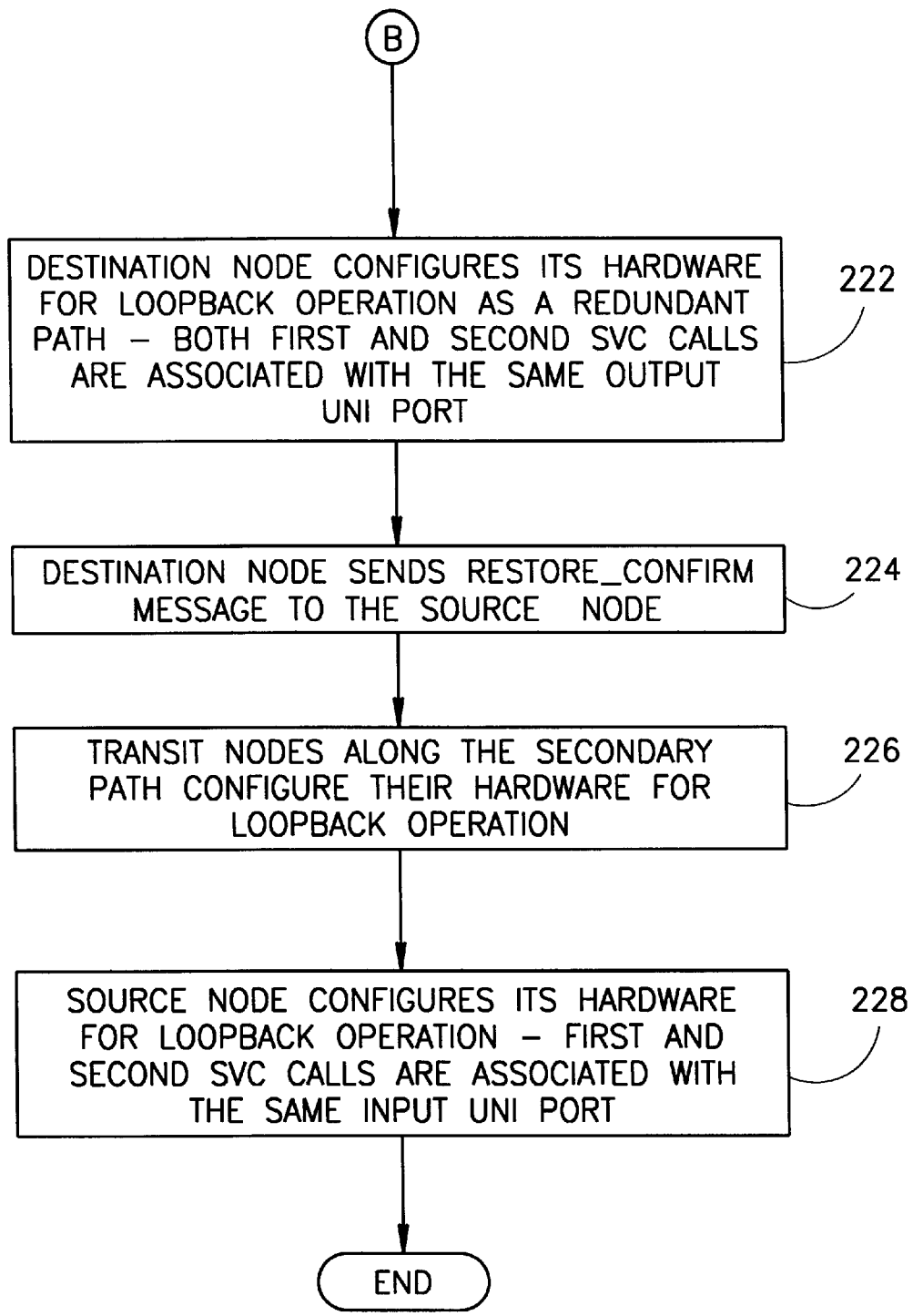

A flow diagram illustrating the method of the second embodiment of establishing switched virtual circuits is shown in FIGS. 13A, 13B and 13C. As described previously, the first step is to establish a first SVC to be the active SVC over the primary (active) path from the source user to the destination user in accordance with conventional ATM signaling, i.e., using VPI/VCI 0/5 (step 190). When the connect is received from the destination user by the source node (step 192) the source node forwards the connect to the source user and sends a RESTORE_SETUP message with the RESTORE_ID to the destination node over the newly established SVC (step 194). Note that the RESTORE_SETUP message comprises a single cell which is forwarded by the transit nodes to the source node.

In response to the RESTORE_SETUP message, the destination node, configures its hardware for loopback operation (step 196). If the destination node does not support the redundancy method, it does not reply. The source will eventually time-out and only the active path will remain.

The destination node sends a RESTORE_CONFIRM message, which comprises a single cell, as a reply back to the source node (step 198). The transit nodes along the path, e.g., transit nodes #1 and #2, detect the cell via their hardware and, in response, make a copy of the cell in hardware while subsequently forwarding it along to the next node along the path. Capturing the cell in hardware triggers the software to examine the contents of the cell. If the node supports the feature, it configures its hardware to support loopback (step 200).

In response to receiving the RESTORE_CONFIRM message, the source node programs its hardware to support loopback (step 202). The source node then attempts to calculate a secondary (redundant) path from the source node to the destination node without including any of the nodes along the primary path (step 204). The second SVC call is then established using conventional ATM signaling and SETUP and CONNECT messages (step 206).

Upon receipt, the destination node searches it database for the NCCI of the primary path (step 208). If the NCCI just received on the redundant path is not found to match the NCCI of a previously established call (step 210), the call is forwarded to the destination user over the UNI port and the call proceeds in the conventional manner (step 212).

If, however, the NCCI just received on the redundant path is found to match the NCCI of a previously established call (step 210), the call is not forwarded to the user since it is a redundant path (step 214). A CONNECT message is sent to the source node (step 216). When the CONNECT message is received (step 218) the source node sends a RESTORE_SETUP message to the destination node over the new redundant path (step 220). The destination node, in response, configures its hardware for loopback operation as part of a redundant path for restoration purposes (step 222). Both the first and second SVC calls are associated with the same output UNI port as described hereinabove.

The destination node then sends a RESTORE_CONFIRM message to the source node (step 224). The transit nodes #3 and #4 along the secondary path function similarly as transit nodes #1 and #2 and configure their hardware for loopback operation (step 226). In response to receiving the RESTORE_CONFIRM, the source node configures its hardware for loopback operation and the first and second SVC calls are associated with the same input UNI port by configuring its switching tables accordingly (step 228).

Figure 14:
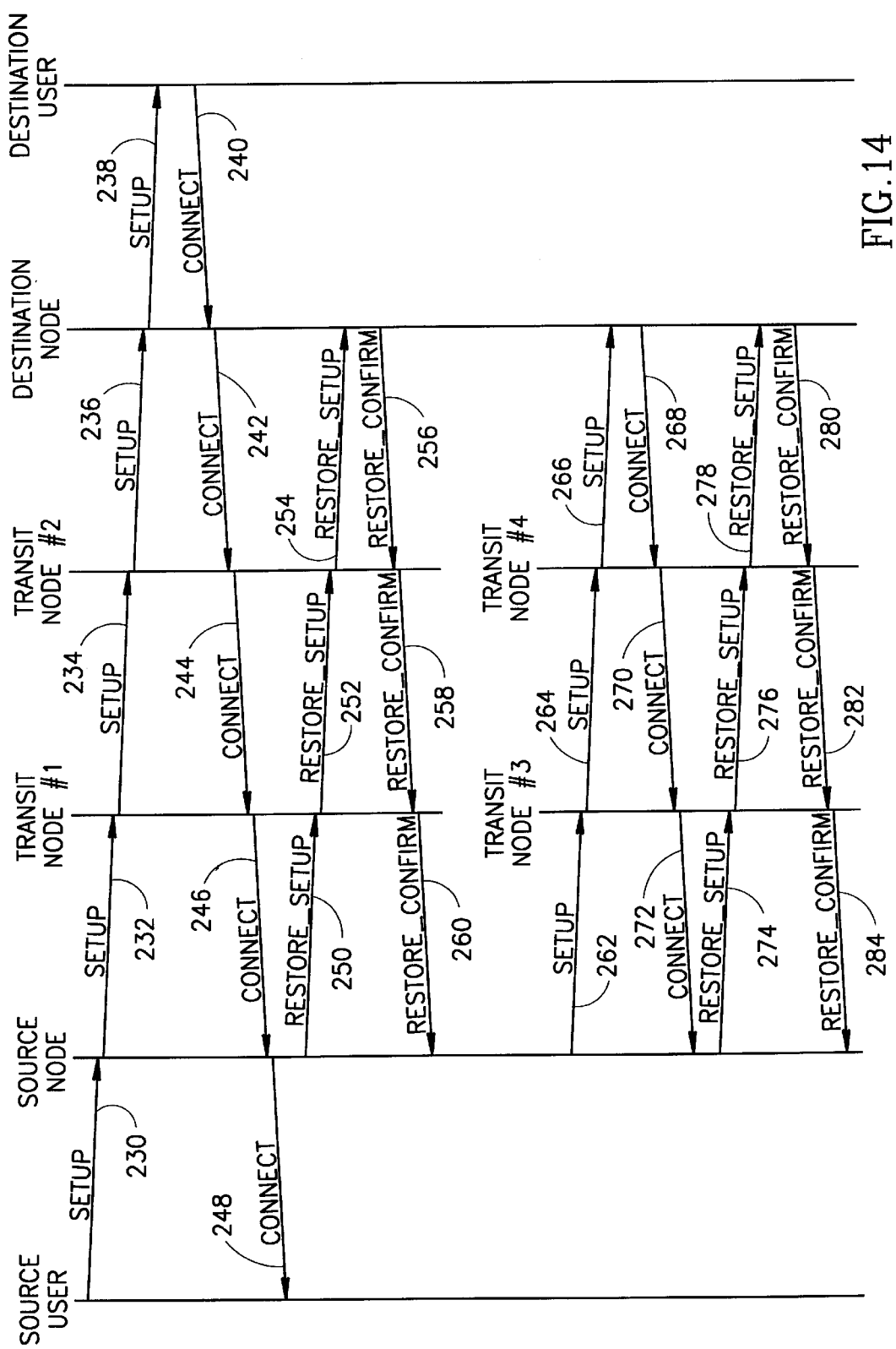
FIG. 14 is a diagram illustrating the message flow between the source user, source node, transmit nodes, destination node and destination user that occurs during the establishment of the primary and redundant paths.

A diagram illustrating the message flow between the source user, source node, transmit nodes, destination node and destination user that occurs during the establishment of the primary and redundant paths is shown in FIG. 14. As described in detail hereinabove, the method begins with a primary SVC being setup between the source user and the destination user in the conventional manner of ATM. The source user sends a SETUP message (reference 230) to the source node which forwards it, in turn, to transit node #1 (reference 232), transit node #2 (reference 234), destination node (reference 236) and finally to the destination user (reference 238). The destination user replies with a CONNECT message which is sent, in turn, to the destination node (reference 240), transit node #2 (reference 242), transit node #1 (reference 244), source node (reference 246) and source user (reference 248).

The source node then generates a RESTORE_SETUP message which is sent, in turn, to transit node #1 (reference 250), transit node #2 (reference 252) and destination node (reference 254). The destination node configures its hardware and generates a RESTORE_CONFIRM message which is sent, in turn, to transit node #2 (reference 256), transit node #1 (reference 258) and the source node (reference 260).

In response, the source node calculates a second (i.e. redundant) path and sends a conventional SETUP message having the same NCCI indication as the first path, in turn, to transit node #3 (reference 262), transit node #4 (reference 264) and to the destination node (reference 266). The destination node finds a match on the NCCI with a previous call and thus concludes that the second SVC is a redundant path. It does not forward the setup to the user and generates a CONNECT message which is sent, in turn, to transit node #4 (reference 268), transit node #3 (reference 270) and the source node (reference 272).

The source node then sends a RESTORE_SETUP with the same RESTORE_ID as the was sent over the primary path, in turn, to transit node #3 (reference 274), transit node #4 (reference 276) and to the destination node (reference 278). The destination node configures its hardware for loopback operation and generates a RESTORE_CONFIRM message which is sent, in turn, to transit node #4 (reference 280), transit node #3 (reference 282) and to the source node (reference 284). The source node then configures its hardware for loopback operation.

Reroute Over the Redundant Path After A Link Break

Figure 15:
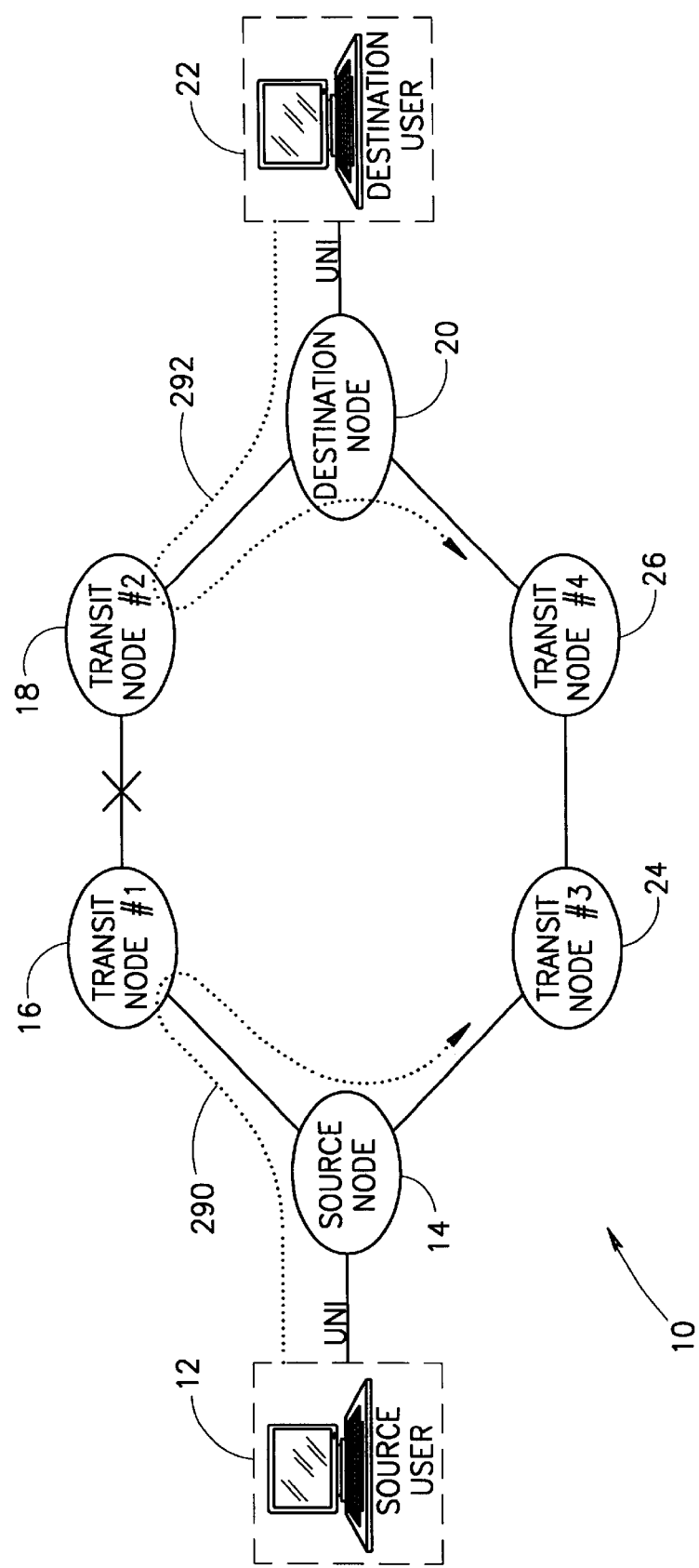
FIG. 15 is a diagram illustrating the data path initially after a node or link break occurs.

The method of the second embodiment will now be described after a node or link break occurs. A diagram illustrating the data path initially after a node or link break occurs is shown in FIG. 15. When a link breaks, the nodes, i.e., transit nodes #1 and #2, on either side of the break detect the break and immediately send an indication to the end nodes, i.e., the source and destination nodes, to reroute the traffic over the redundant path as represented by dotted lines 290 and 292. The cells being transmitted from the end nodes are looped back to the end nodes. In addition, the end nodes cease transmitting cells onto the primary path.

Figure 16:
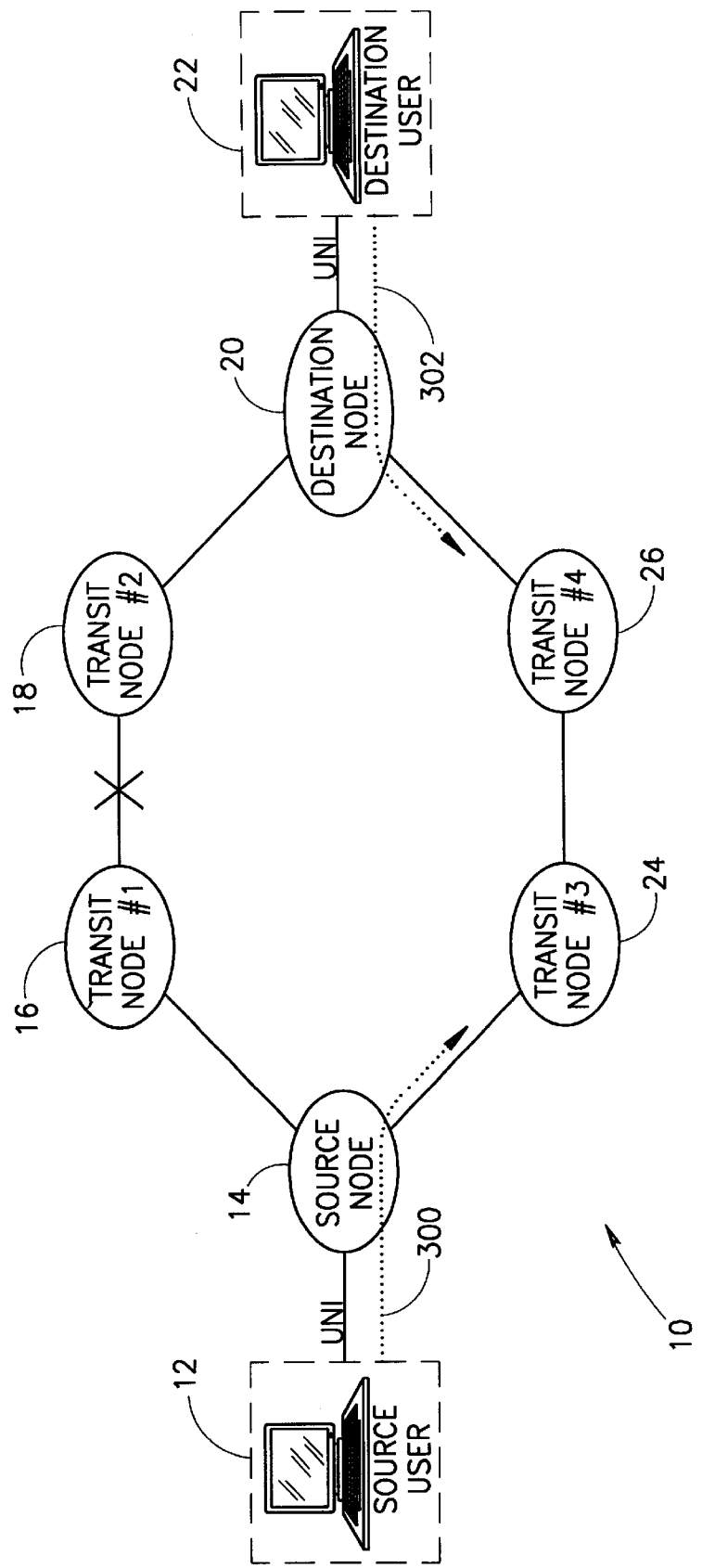
FIG. 16 is a diagram illustrating the eventual data path after a node or link break occurs.

A diagram illustrating the eventual cell path after a node or link break occurs is shown in FIG. 16. The dotted line 300 for the source node and 302 for the destination node indicate the call path after all the cells have been flushed from the broken primary path onto the redundant path.

Figure 17:
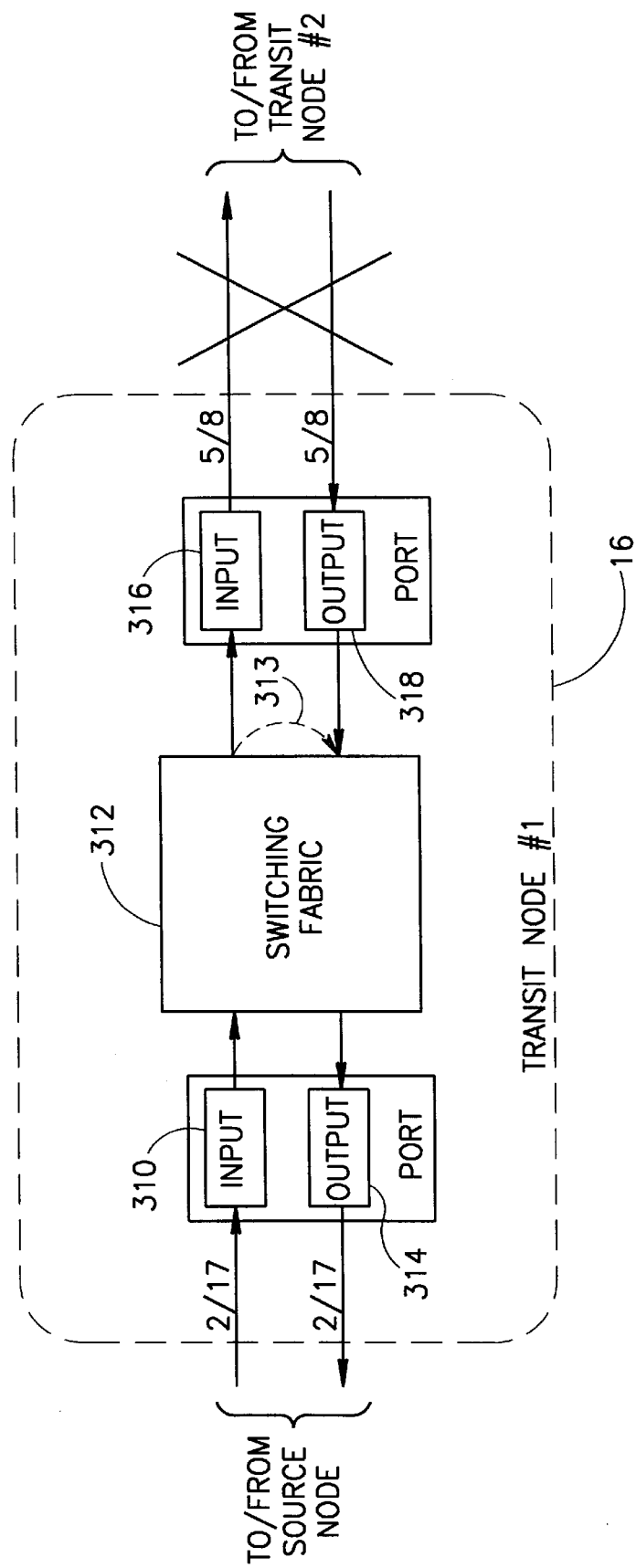
FIG. 17 is a block diagram illustrating the ports and switching fabric of a transit node in more detail on one side of the link break.

The mechanism of loopback at the transit nodes and at the end nodes will now be described in more detail. A block diagram illustrating the ports and switching fabric of a transit node in more detail on one side of the link break is shown in FIG. 17. As an example, the internal structure of transit node #1 is shown. The transit node, on the side of the connection to/from the source node, comprises a port having an input portion 310 and an output portion 314. On the side of the connection to/from the destination node, the transit node comprises a port having an input portion 318 and an output portion 316. The input and output circuits have been assigned VPI/VCI 5/18. A switching fabric 312 provides the switching functionality to switch between input and output ports on both sides of the switch.

The break is indicated in FIG. 17 as the large 'X' placed over the connections to transit node #2. The break is detected by transit node #1 very quickly since the break is detected by hardware rather than software. In immediate response to the detection of the break, the hardware switches to loopback operation. The first cell, however, to be sent back to the source node is a special RESTORE_LOOPBACK cell. Note that the same RESTORE_LOOPBACK cell is used for all the switches in the network. The node then sends all cells that have been received that are in its Rx buffers to the source node. Then, the Tx buffers are looped back to the Tx direction. The data that would be output to output port 316 is now looped back to the switching fabric, at a similar point as data input to input port 318, as represented by dotted line 313. Thus, the data arriving at the input port 310 is looped back through the switch to the output port 314. A similar scenario exists on transit node #2. In this fashion, only the cell that happened to be in the midst of transmission over the link when it failed, will be lost.

Figure 18:
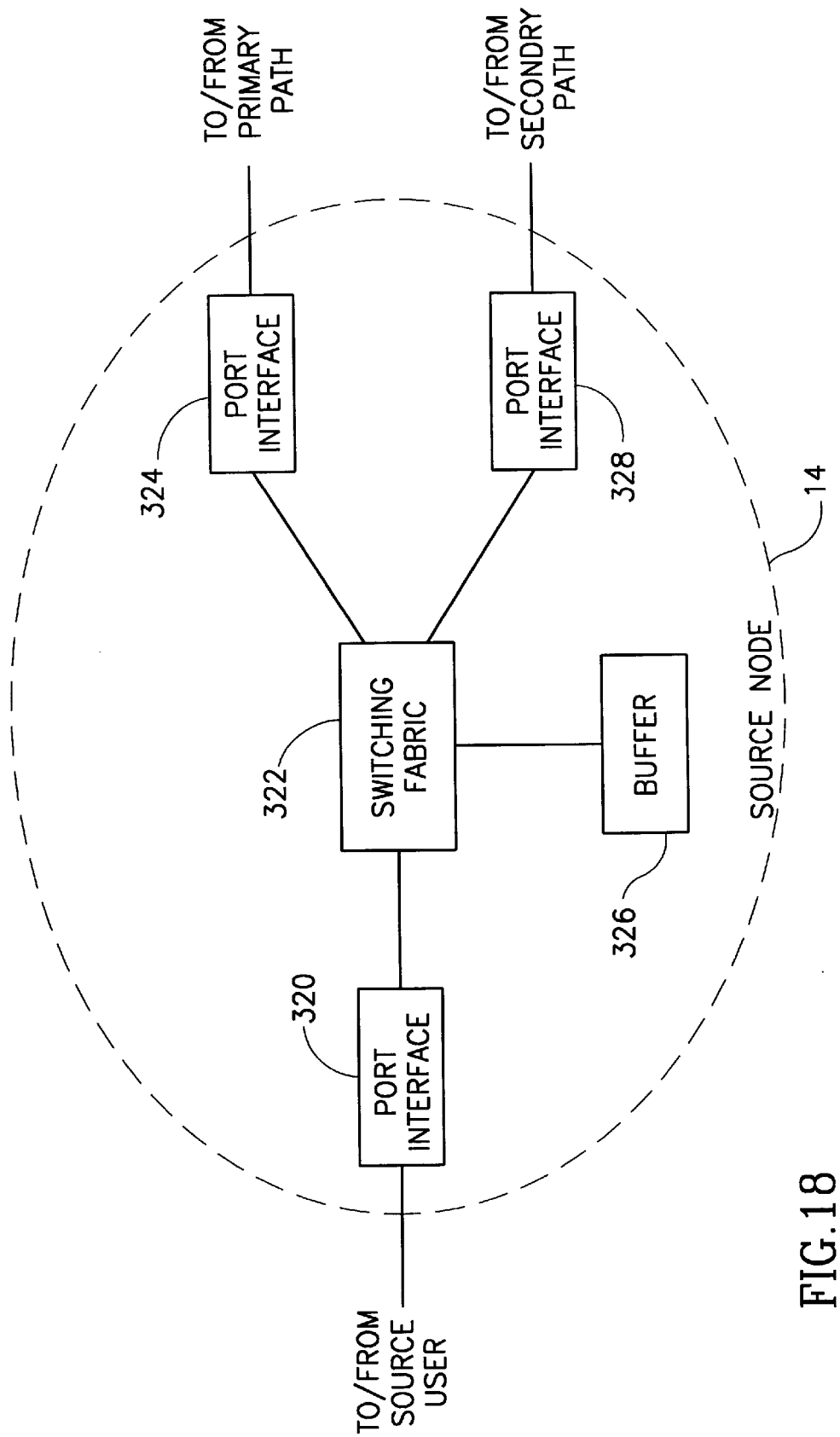
FIG. 18 is a block diagram illustrating the structure of the source node in more detail.

A block diagram illustrating the structure of the source node in more detail is shown in FIG. 18. Note that both end nodes comprise similar structure as that shown in FIG. 18. The source node comprises a port interface 320 to/from the source user, port interface 324 to/from the primary path, port interface 328 to/from the secondary (redundant) path, a memory buffer 326 and a switching fabric 322.

The operation of the source node at the time of a link break will now be described in more detail. The end nodes function to receive and detect the RESTORE_LOOPBACK cell via their hardware with no software examination. This indicates to the end nodes that a link has failed somewhere along the path. Note that detecting the link failure via Q.SAAL signaling takes a relatively much longer time than the time to detect the failure in hardware. Thus, there is sufficient time to reroute the data to the redundant path before the signaling software gets a chance to clear the call path.

A state machine in the end switches is triggered which causes each Rx data to be rerouted over the redundant path that was previously established with the same RESTORE_ID. The Rx data that is looped back is then transmitted as Tx data over the redundant path. Recall that the two paths were previously associated with each other in their switch tables. The end nodes know which paths are involved as they receive the RESTORE_LOOPBACK cell over a particular VPI/VCI. This is then used to determine the associated redundant path.

In the first embodiment, once the end nodes detect the break, they switch the active path to the redundant path thus loosing the majority of the data in the pipe of the path previous. In another preferred embodiment, transmission of cells onto the broken path is stopped and cells received from the user over the UNI port are stored in a buffer which may comprise a First In First Out (FIFO) buffer. The original RESTORE_ID is sent in a special message called a RESTORE_FLUSH message as a final cell over the broken path. When this message is received back, the end node knows that the broken path's pipe has been flushed and it may begin to transmit the contents of the buffer over the redundant path. Note that the size of the FIFO buffer should be sufficiently large to hold twice the number of cells that would be in the active path pipe extending from the source node to the destination node. This is a worst case scenario whereby the link break occurs at the destination node and the FIFO buffer must buffer two times the number of cells that can fit in the pipe at one time.

Figure 19:
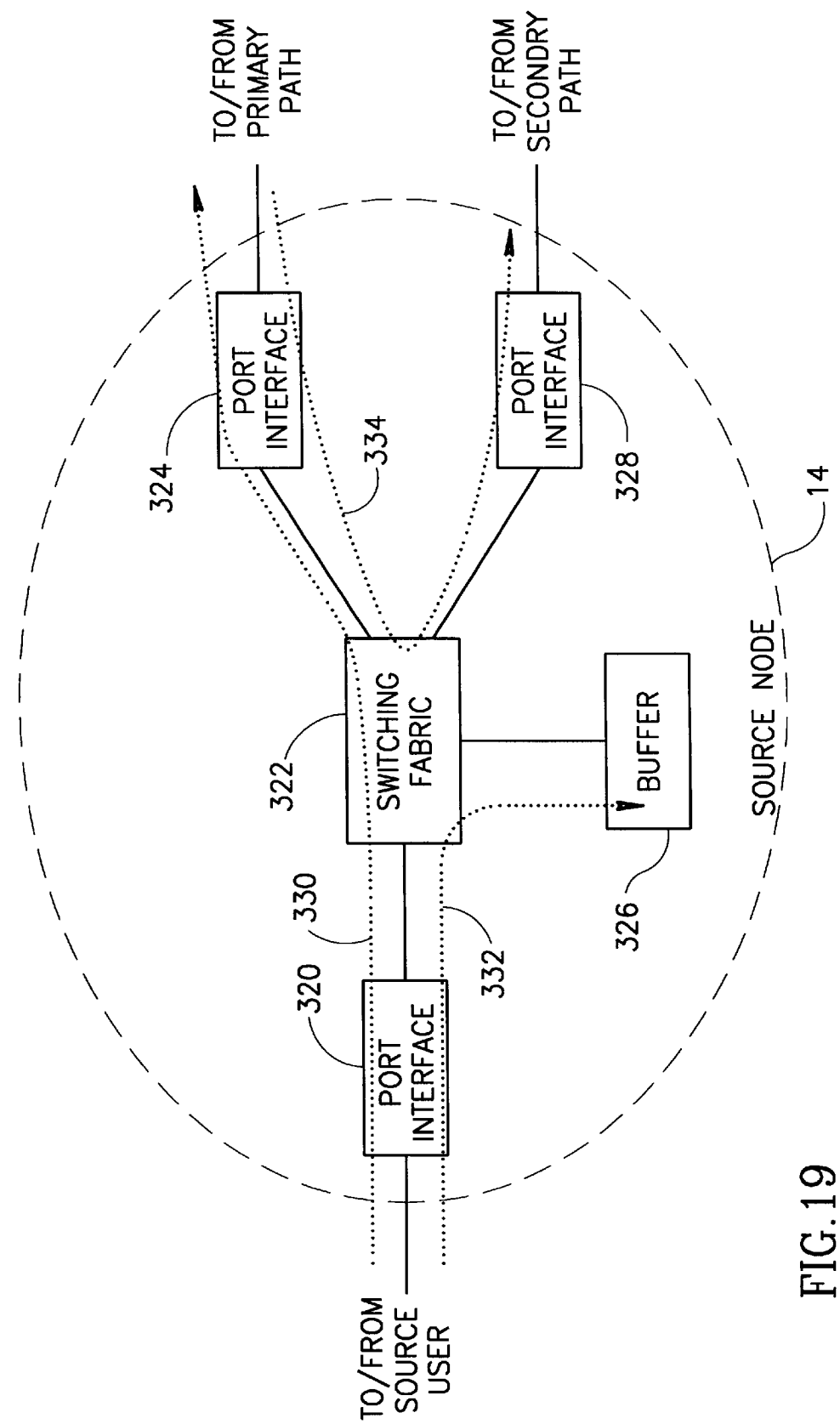
FIG. 19 is a block diagram illustrating the data flow in the source node immediately after a node or link break.

A block diagram illustrating the data flow in the source node immediately after a node or link break is shown in FIG. 19. Dotted line 330 represents the cell flow before the break and after the break up to the receipt of the RESTORE_LOOPBACK cell. Immediately after a link break occurs, the nodes on either side of the break immediately transmit the RESTORE_LOOPBACK cell over their Tx connection. These nodes then loop back the data received over their Rx ports to their Tx ports. When the RESTORE_LOOPBACK cell is detected by the end (edge) node, its switching fabric is configured to transmit cells onto the redundant path as represented by the dotted line 334. The node reroutes all the data cells received over the broken path onto the redundant path.

The node also stops transmitting cells over the broken path and transmits a final RESTORE_FLUSH cell over the broken path. The node also begins buffering the cells received from the user over the UNI port as represented by the dotted line 332.

Figure 20:
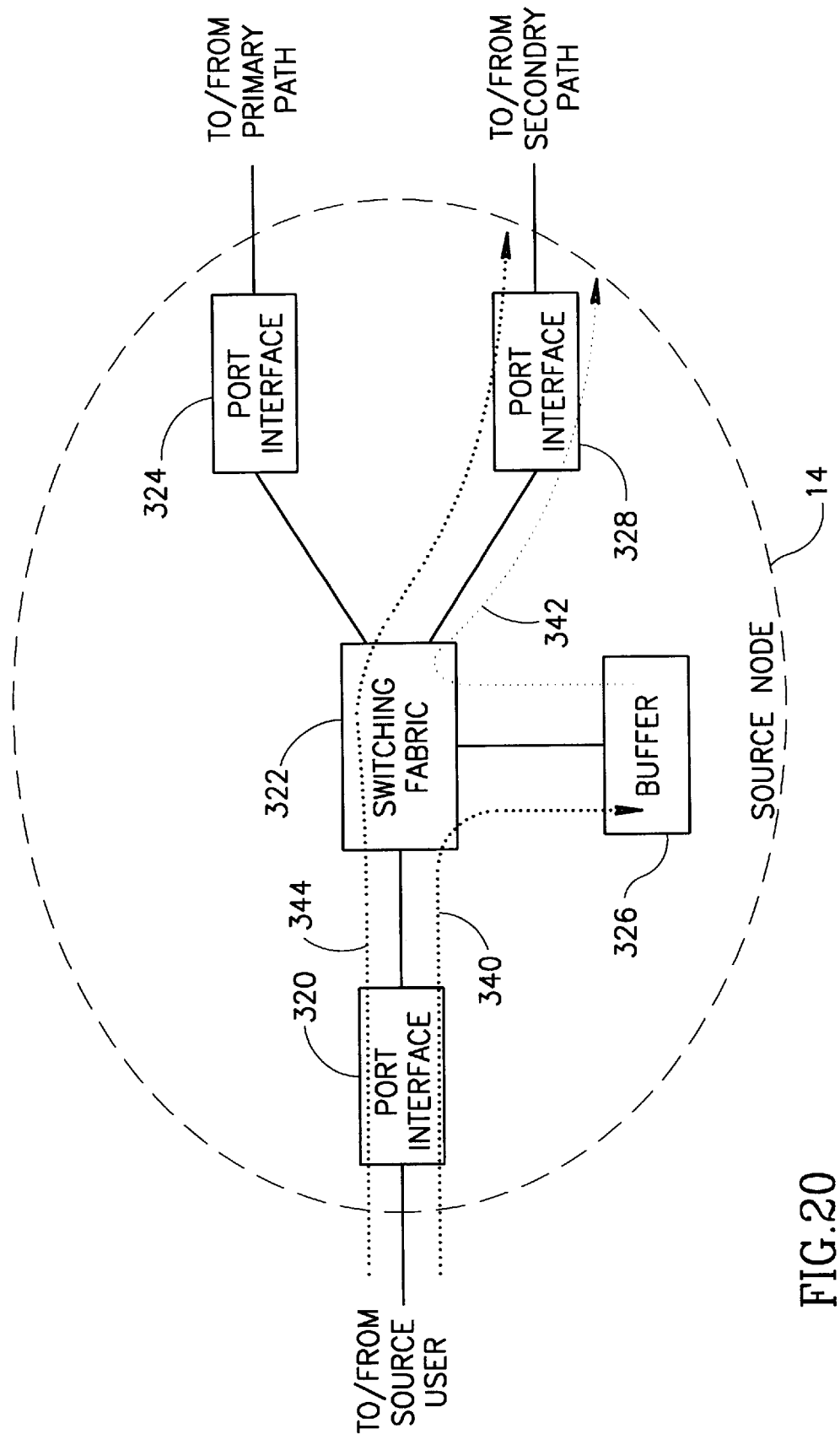
FIG. 20 is a block diagram illustrating the data flow via the buffer in the source node after a node or link break.

A block diagram illustrating the data flow via the buffer in the source node after a node or link break is shown in FIG. 20. Once the RESTORE_FLUSH cell is received back by the node, the node begins to transmit the contents of the buffer onto the redundant path as represented by the dotted line 342. The cells received over the UNI port continue to be stored in the buffer until the buffer is emptied as represented by the dotted line 340. Once the buffer is emptied, cells received from the user are transmitted directly onto the redundant path, as represented by dotted line 344, and the buffer is freed.

Figure 21A:
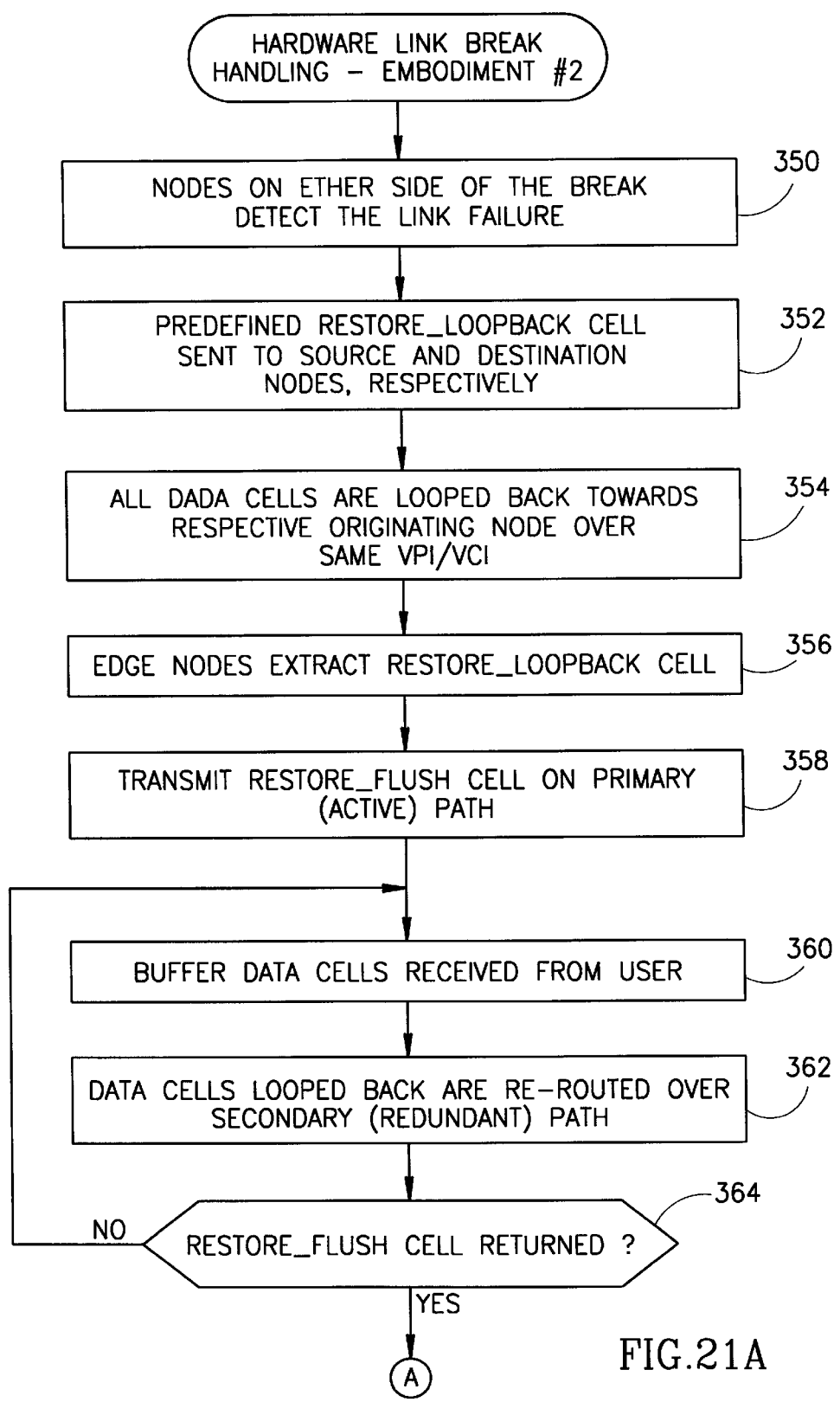
FIGS. 21A and 21B are a flow diagram illustrating the hardware portion of the method of the second embodiment of handling a node or link break.
Figure 21B:
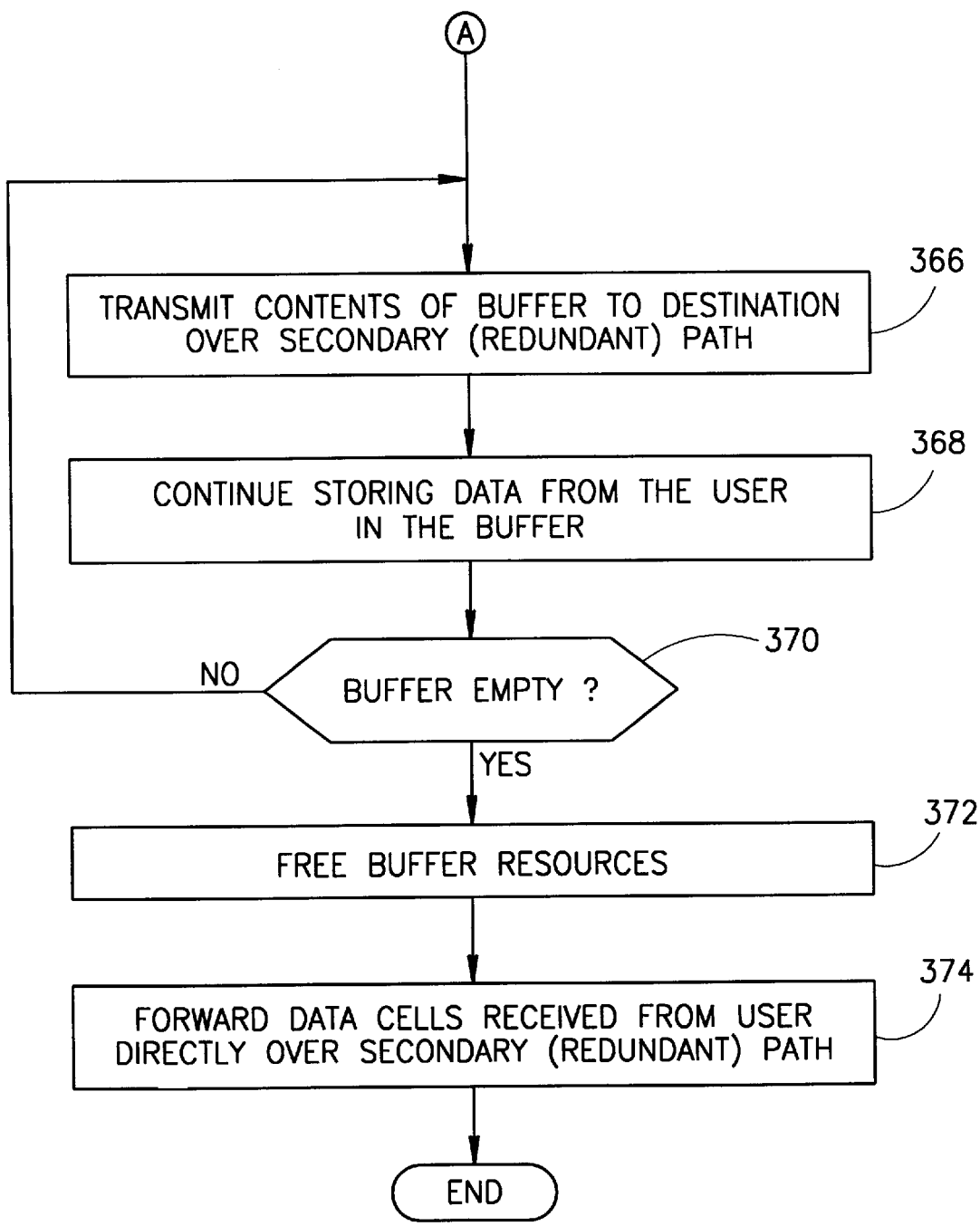

A flow diagram illustrating the hardware portion of the method of the second embodiment of handling a node or link break is shown in FIGS. 21A and 21B. Initially, the nodes on either side of the break detect that the link has failed (step 350). A predefined RESTORE_LOOPBACK cell is sent to the end nodes, i.e., source and destination nodes (step 352). All the data cells are then looped back towards the originating node over the same VPI/VCI pair (step 354). The edge nodes detect the break by extracting the RESTORE_LOOPBACK cell from the cell flow (step 356). The end nodes transmit a RESTORE_FLUSH cell on the primary (active) path (step 358).

Data cells received from the user via the UNI port are then stored in the FIFO buffer (step 360). The data cells looped back from the broken path are rerouted over the redundant path (step 362). The node then checks for the arrival of the RESTORE_FLUSH cell (step 364). If it is not received, the node continues to buffer incoming cells. When it does arrive, the node transmits the contents of the buffer to the destination over the redundant path (step 366). Incoming cells continue to be stored in the buffer (step 368). Once the buffer is empty (step 370), the buffer resources are freed (step 372) and the cells received from the user are sent directly over the redundant path.

In accordance with the present invention, both the source and the destination nodes listen on the receivers on their respective redundant paths. If data is received it is sent to the end user. Data may be received over the redundant path in the case when the transit node adjacent to the break on the side of the end node receiving the data, does not support the method of the present invention. In this case, the end node must wait for the signaling in the transit node to send it a RELEASE message.

Figure 22:
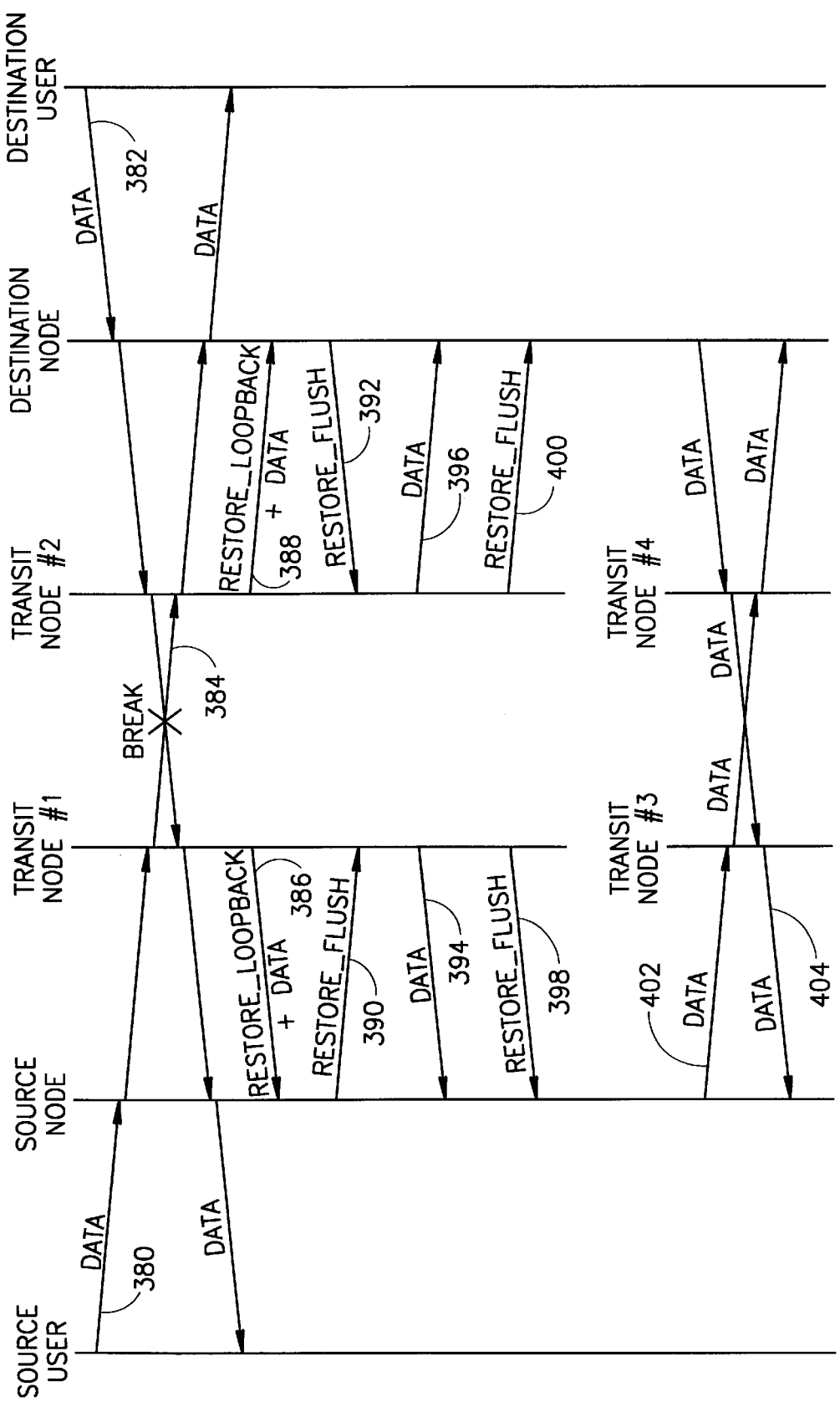
FIG. 22 is a diagram illustrating the message flow between the source user, source node, transmit nodes, destination node and destination user that occurs when a node or link breaks using the method of the second embodiment.

A diagram illustrating the message flow between the source user, source node, transmit nodes, destination node and destination user that occurs when a node or link breaks using the method of the second embodiment is shown in FIG. 22. References 380 and 382 represent the data traffic normally flowing between the source and destination user before a link break occurs. As described in more detail hereinabove, the link break (reference 384) causes the RESTORE_LOOPBACK cell to be transmitted to the end nodes (references 386, 388). In response, the end nodes begin storing the incoming cells in the buffer and they stop transmitting cells onto the broken path. The cells looped back are sent to the destination over the redundant path instead (references 402, 404).

The final cell transmitted over the broken path is a RESTORE_FLUSH cell (references 390, 392). The broken path's pipe is then flushed (references 394, 396) and the data looped back is sent over the redundant path. Once the broken link is flushed, the end nodes receive the RESTORE_FLUSH cell (references 398, 400). This cell signals to the end nodes to begin emptying their buffers over the redundant path. Once empty, the buffers are released and incoming data is sent directly over the redundant path.

Figure 23:
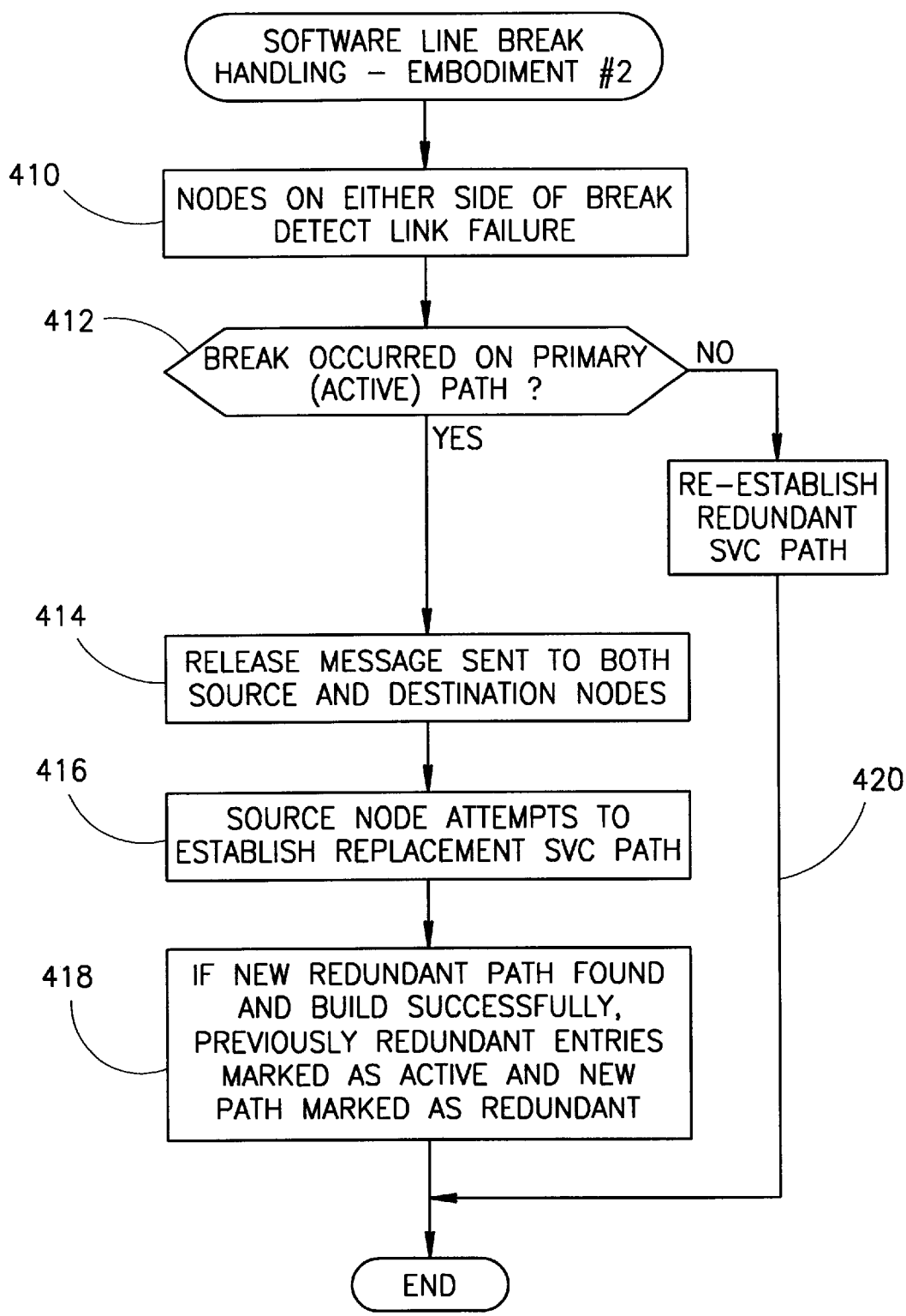
FIG. 23 is a flow diagram illustrating a first software portion of the method of the second embodiment of handling a node or link break.

A flow diagram illustrating the method of re-establishing the redundant path after a link failure is shown in FIG. 23. As previously described, after a link break occurs, both nodes on either side of the break detect the link failure (step 410). If the break occurred on the redundant (secondary) path (step 412) then the redundant SVC is re-established (step 420). If the break occurred on the primary (active) path, both transit nodes adjacent to the break send a release message to their respective end nodes, i.e., the source and destination nodes (step 414). The software detects the link break much later in time than the hardware, thus when the RELEASE message is received by the end nodes, it can be assumed that the call was rerouted already.

The end nodes then attempt to establish a new SVC call as a replacement redundant path (step 416). If a new redundant path is found and built successfully, the previous redundant entries in the switching tables of the nodes are marked as active and the new path is marked as redundant (step 418). In this fashion, when a link break occurs, a new redundant path is created to replace the one made active.

Figure 24:
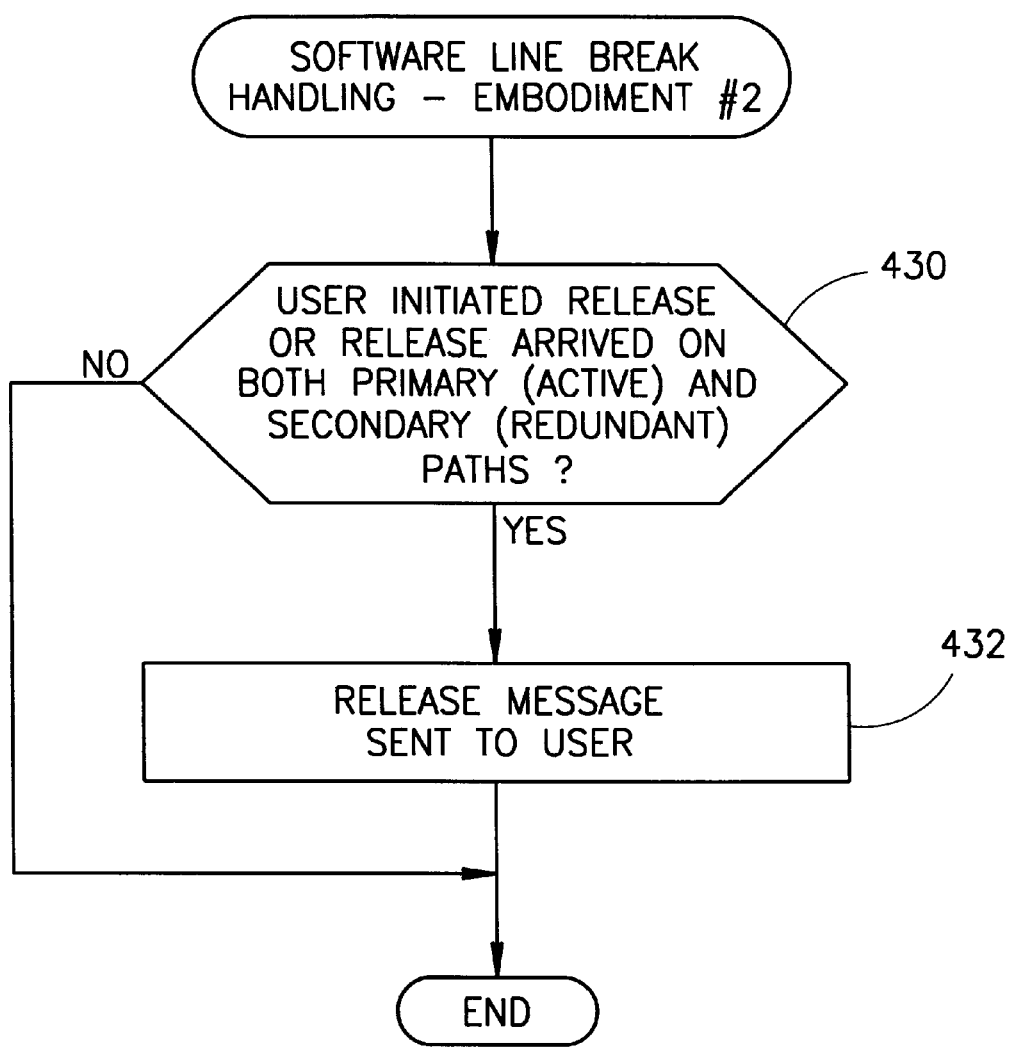
FIG. 24 is a flow diagram illustrating a second software portion of the method of the second embodiment of handling a node or link break.

A flow diagram illustrating the method of releasing the call is shown in FIG. 24. If at any time during the call, the call may be released for the following reasons: (1) a user initiated the release or (2) a release arrives on the active (primary) path and the redundant (secondary) path (step 430). When a release is received by an end node, a RELEASE message is sent to the user and the call is teared down (step 432).

Note that, alternatively, the restoration method of the present invention can be implemented without the use of the buffers in the end nodes. This embodiment is less efficient since more cells will be lost, but it is still more efficient than prior art restoration schemes.

While the invention has been described with respect to a limited number of embodiments, it will be appreciated that many variations, modifications and other applications of the invention may be made.

What is claimed is:

1. In an Asynchronous Transfer Mode (ATM) network including a source and destination user, end nodes including source and destination nodes and a plurality of transit nodes, a method of restoring a call in the event of a link failure, said method comprising the steps of:

establishing a first active switch table and a first redundant switch table on said source node;

establishing a second active switch table and a second redundant switch table on said destination node;

establishing a first Switched Virtual Circuit (SVC) call from said source user to said destination user to function as an active path;

establishing a second SVC call from said source node to said destination node to function as a redundant path;

configuring said first active switch table and said second active switch table to utilize said first SVC as the active path;

configuring said first redundant switch table and said second redundant switch table to utilize said second SVC as the redundant path using a global call ID to identity said second SVC call as the redundant path;

receiving an indication at said end nodes that a link failure has occurred; and configuring said source node to use the redundant path in response to said indication wherein said redundant path is determined in accordance with said first redundant switch table, and configuring said destination node to use the redundant path in response to said indication wherein said redundant path is determined in accordance with said second redundant switch table.

2. The method according to claim 1, wherein said first SVC call is established utilizing conventional ATM signaling.

3. The method according to claim 1, wherein said second SVC call is established utilizing conventional ATM signaling.

4. The method according to claim 1, wherein said step of configuring said first redundant switch table to utilize said second SVC comprises the step of searching said first active switch table in said source node for an entry previously configured having the same call ID.

5. The method according to claim 1, wherein said step of receiving an indication comprises the step of generating and sending a release message on the nodes located on either side of said link failure.

6. The method according to claim 1, wherein said step of configuring said source node to use the redundant path comprises the step of checking whether an entry corresponding to said redundant path exists in in said first redundant switch table.

7. The method according to claim 1, further comprising the step of freeing the resources held by the active path after rerouting cell traffic over the redundant path.

8. The method in accordance with claim 7, wherein said step of freeing said resources comprises the step of freeing one or more entries in said first active switching table in said source node and said second active switch table in said destination node after cell traffic is rerouted over the redundant path.

9. The method according to claim 1, further comprising the step of establishing a third SVC after said second SVC is made the active path, said third SVC functioning as a new redundant path.

10. The method according to claim 1, further comprising the step of establishing a third SVC in the event the redundant path fails before a link failure occurs, said third SVC functioning as a replacement redundant path.

11. The method according to claim 1, wherein said step of configuring said second redundant switch table to utilize said second SVC comprises the step of searching said second active switch table in said destination node for an entry previously configured having the same call ID.

12. The method according to claim 1, wherein said step of configuring said destination node to use the redundant path comprises the step of checking whether an entry corresponding to said redundant path exists in said second redundant switch table.

13. The method according to claim 1, wherein said global call ID comprises a Network Call Correlation Identifier (NCCI).

14. In an Asynchronous Transfer Mode (ATM) network including a source and destination user, end nodes including source and destination nodes, a first plurality of transit nodes and a second plurality of transit nodes, a method of establishing a redundant path, said method comprising the steps of:

establishing a first active switch table and a first redundant switch table on said source node;

establishing a second active switch table and a second redundant switch table on said destination node;

establishing a first Switched Virtual Circuit (SVC) call from said source user to said destination user;

indicating to said destination node and any intermediary transmit nodes, via a first indication, that said first SVC is to function as an active path;

configuring said second active switch table in said destination node and said first plurality of transit nodes, both in response to said first indication, and said first active switch table in said source node to utilize said first SVC as the active path in a redundant call;

establishing a second SVC call from said source node to said destination node;

indicating to said destination node and any intermediary transmit nodes, via a second indication, that said second SVC is to function as a redundant path; and configuring said second redundant switch table in said destination node and said second plurality of transit nodes, both in response to said second indication, and said first redundant switch table in said source node to utilize said second SVC as the redundant path in a redundant call utilizing a global call ID to identity said second SVC call as the redundant path.

15. The method according to claim 14, wherein said first SVC call is established utilizing conventional ATM signaling.

16. The method according to claim 14, wherein said second SVC call is established utilizing conventional ATM signaling.

17. The method according to claim 14, wherein said step of indicating that said first SVC is to function as an active path comprises the steps of:

sending a restore setup message from said source node to said destination node;

configuring said destination node, in response to said restore setup message, to use said first SVC as an active path; and replying to said source node with a restore confirm message.

18. The method according to claim 14, wherein said step of indicating that said second SVC is to function as a redundant path comprises the steps of:
sending a restore setup message from said source node to said destination node;
configuring said destination node, in response to said restore setup message, to use said second SVC as a redundant path; and
replying to said source node with a restore confirm message.

19. The method according to claim 14, wherein said step of establishing a second SVC call comprises the step of calculating the redundant path such that it does not include any of the nodes on the active path with the exception of said end nodes.

20. The method according to claim 14, further comprising the step of determining, on said destination node, whether the global call ID of the second SVC call matches that of any call previously received.

21. The method according to claim 14, wherein said step of configuring in response to said second indication comprises the step of associating a first outbound Virtual Path Identifier/Virtual Circuit Identifier (VPI/VCI) pair corresponding to said active path and a second outbound VPI/VCI pair corresponding to said redundant path on said source node with a single inbound VPI/VCI pair from said source user.

22. The method according to claim 14, wherein said step of configuring in response to said second indication comprises the step of associating a first inbound Virtual Path Identifier/Virtual Circuit Identifier (VPI/VCI) pair corresponding to said active path and a second inbound VPI/VCI pair corresponding to said redundant path on said destination node with a single outbound VPI/VCI pair to said destination user.

23. The method according to claim 14, further comprising the step of configuring said first plurality of transit nodes and said second plurality of transit nodes between said source and destination nodes for loopback operation in the event of a link failure.

24. The method according to claim 14, wherein said global call ID comprises a Network Call Correlation Identifier (NCCI).

25. In an Asynchronous Transfer Mode (ATM) network including a source and destination user, end nodes including source and destination nodes, a first plurality of transit nodes and a second plurality of transit nodes, a method of switching to a redundant path previously established, said method comprising the steps of:
detecting the occurrence of a link failure by detecting nodes on either side of the link failure thus creating a broken active path;
sending a loopback cell back from each detecting node to its respective end node;
looping back cells arriving at said detecting nodes to their respective end nodes;
detecting the arrival of said loopback cell at said end nodes;
sending a flush cell out onto the broken active path by each said end node;
buffering cells received from said source user and said destination user in a buffer within each end node;
transmitting cells received from said broken active path over the redundant path;
transmitting the contents of said buffer on each said end node onto the redundant path; and
transmitting cells received from said source user and said destination user directly onto the redundant path.

26. The method according to claim 25, wherein said step of detecting the occurrence of said link failure is performed substantially in hardware.

27. The method according to claims 25, wherein said loopback cell is the first cell to be transmitted back from each detecting node to its respective end node.

28. The method according to claim 25, wherein the step of detecting the arrival of said loopback cell is performed substantially in hardware.

29. The method according to claim 25, further comprising the steps of:
sending a release via software from said detecting nodes on either side of the break to their respective end nodes;
calculating a third SVC to function as a new redundant path;
establishing said third SVC as the new redundant path;
releasing the active path and configuring said second SVC as a new active path; and
configuring said third SVC as the new redundant path.

30. The method according to claim 25, further comprising the step of establishing a third SVC in the event the redundant path fails before a link failure occurs, said third SVC functioning as a replacement redundant path.

* * * * *